(12) United States Patent
Van Camp

(10) Patent No.: US 7,515,900 B2
(45) Date of Patent: Apr. 7, 2009

(54) METHOD AND APPARATUS FOR COMMUNICATION

(75) Inventor: R. Allen Van Camp, Ortonville, MI (US)

(73) Assignee: Ciliko Wireless Incorporated, Clarkston, MI (US)

( * ) Notice: Subject to any disclaimer, the term of this patent is extended or adjusted under 35 U.S.C. 154(b) by 448 days.

(21) Appl. No.: 10/914,851

(22) Filed: Aug. 9, 2004

(65) Prior Publication Data

US 2005/0118983 A1    Jun. 2, 2005

Related U.S. Application Data

(63) Continuation-in-part of application No. 10/637,987, filed on Aug. 8, 2003, now Pat. No. 7,068,994.

(51) Int. Cl.
*H04M 11/04* (2006.01)

(52) U.S. Cl. .................. 455/404.2; 455/425

(58) Field of Classification Search ............. 455/404.1, 455/404.2, 425, 411, 423, 456.1, 456.4, 456.5, 455/456.6
See application file for complete search history.

(56) References Cited

U.S. PATENT DOCUMENTS

| | | | |
|---|---|---|---|
| 6,332,073 B1 * | 12/2001 | Nilsson et al. | 455/404.1 |
| 6,349,201 B1 * | 2/2002 | Ford | 455/404.1 |
| 2005/0200479 A1 * | 9/2005 | James | 455/404.1 |
| 2006/0040643 A1 * | 2/2006 | O'Connor | 455/412.1 |

* cited by examiner

*Primary Examiner*—Sam Bhattacharya

(57) ABSTRACT

A communication system according to various aspects of the present invention comprises one or more remote units. The communication system may also include at least one communication center. The remote units may also be configured to communicate with each other. The communication center and/or the remote unit may be configured to determine the location of another remote unit.

15 Claims, 27 Drawing Sheets

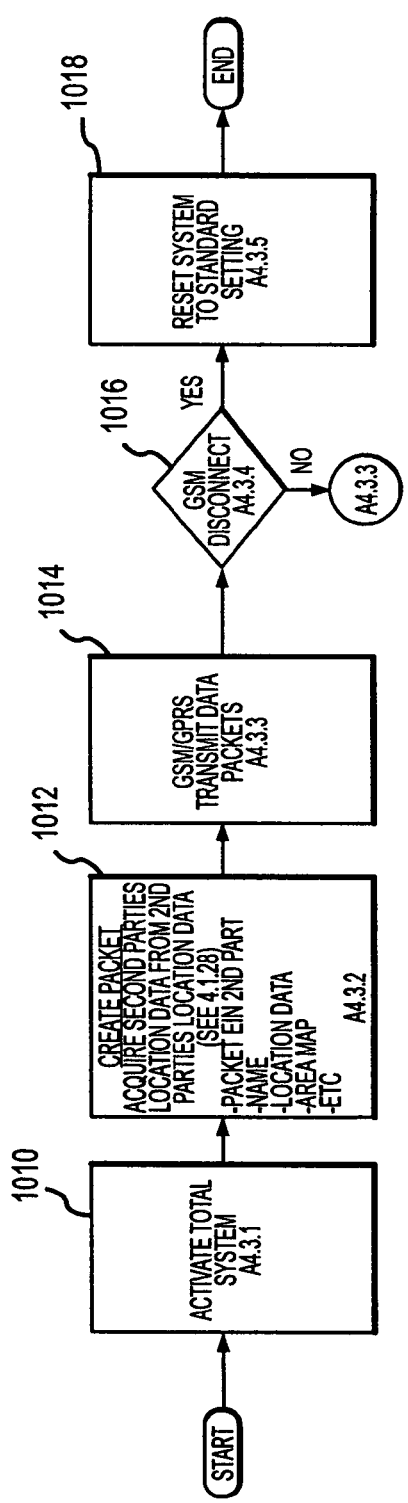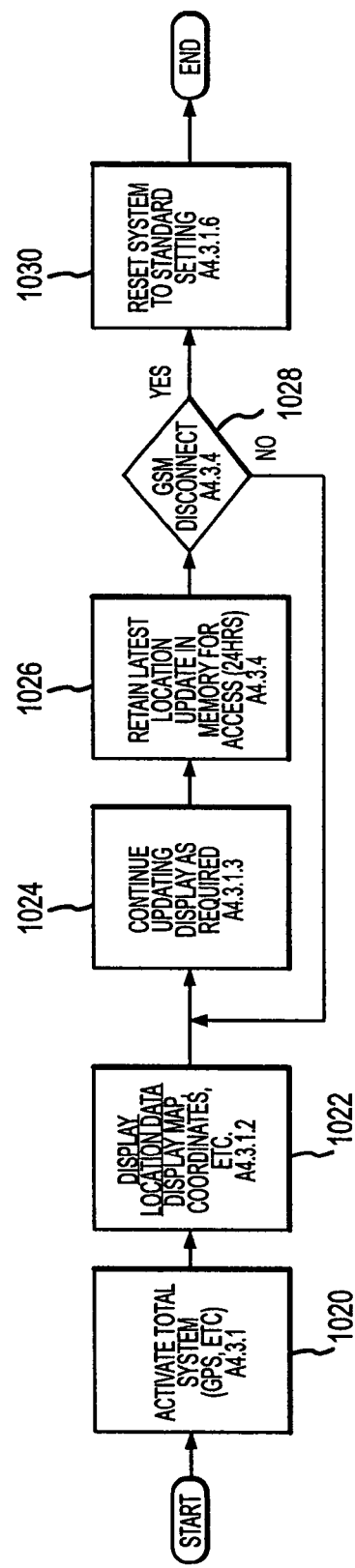
FIG.10A
FIG.10B

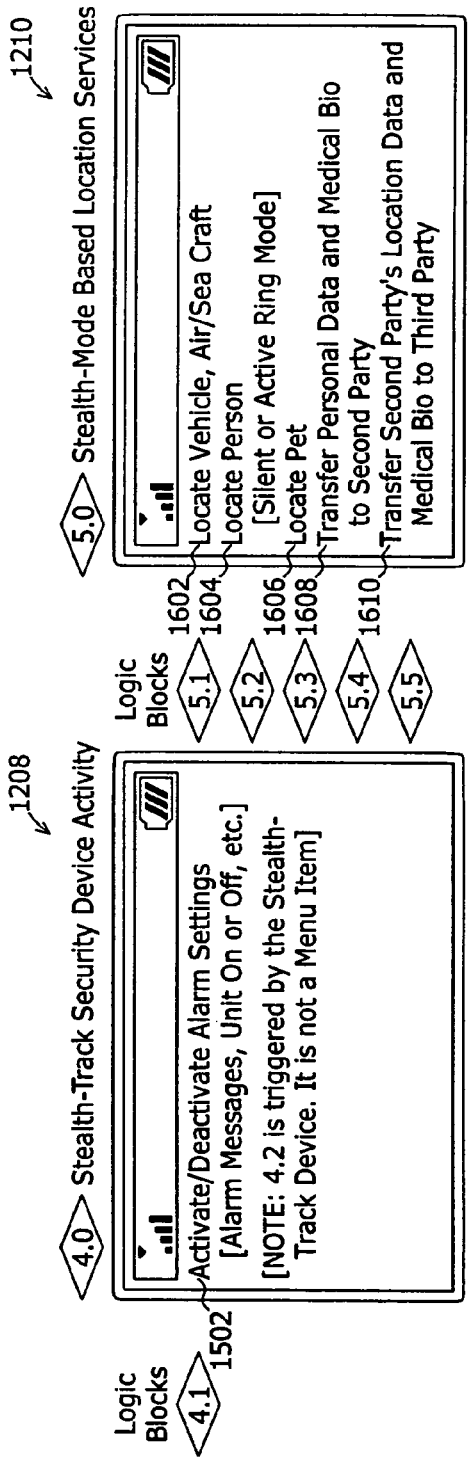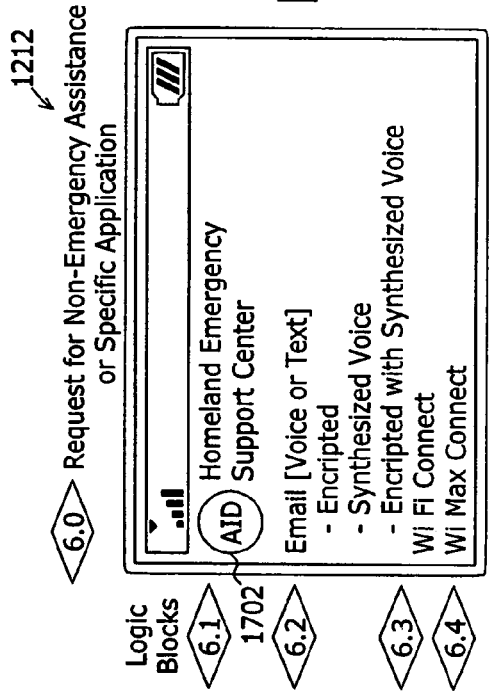
Figure 15
Figure 16
Figure 17

METHOD AND APPARATUS FOR COMMUNICATION

RELATED APPLICATIONS

This application is a continuation-in-part of U.S. patent application Ser. No. 10/637,987, filed Aug. 8, 2003, now U.S. Pat. No. 7,068,994 and entitled, "Method and Apparatus for Comunication," which is incorporated herein by reference.

FIELD OF THE INVENTION

The invention relates to methods and apparatus for communication.

BACKGROUND OF THE INVENTION

Communications systems, especially personal communications systems, have recently developed dramatically. The popularization of cellular telephones and the Internet have contributed to better, faster, more reliable, and more cost effective technologies. Current cellular telephones are tiny compared to their predecessors, and provide much more powerful applications and services.

Despite the availability of many applications, current communication systems are still largely limited to voice communication functions. Communications between cellular telephones or other devices typically comprise ordinary voice communications. In an emergency, cellular telephone users contact local authorities, such as by dialing 9-1-1. To locate another person, such as a family member in a time of emergency, the caller dials the person's cellular telephone number to contact the person and talk about the person's location. If the person does not answer, however, the caller must ordinarily wait for a return call or try again. Similarly, for operations utilizing remote personnel, such as technical field forces or sales forces, locations are typically determined by regularly contacting a central office. In the absence of ordinary voice communication, however, the central office may not be able to establish the location of the various personnel.

SUMMARY OF THE INVENTION

A communication system according to various aspects of the present invention comprises one or more remote units. The communication system may also include at least one communication center. The remote units may be configured to communicate with the communication center. The remote units may also be configured to communicate with each other. The communication center and/or the remote units are suitably configured to determine the location of another remote unit.

In general, in one aspect, the invention comprises a communication terminal configured to communicate with a communication network that is configured to receive signals from multiple communication units, transfer data within the network, and transmit the signals to the communication units and to at least another communication destination. The communication terminal includes a transmitter configured to send communication signals, and a controller configured to initiate communication from the terminal to the communication network, wherein the controller is configured to inhibit initiating communication from the terminal to the communication network except for communications intended for a subset of the multiple communication units and the at least another communication destination.

Implementations of the invention may include one or more of the following features. The controller can be configured to initiate communication from the terminal to the communication network intended for an emergency service. The controller can be configured to initiate communication from the terminal to the communication network intended for a destination associated with school attended by a user of the mobile communication terminal. The controller can be configured to initiate communication from the terminal to the communication network intended for telephones associated with persons associated with a user of the mobile communication terminal. The transmitter can be configured to communicate with the communication network wirelessly.

In general, in another aspect, the invention describes a communication terminal configured to communicate with a communication network that is configured to receive signals from multiple communication units, transfer data within the network, and transmit the signals to the communication units and to at least another communication destination. The communication terminal includes a receiver configured to receive communication signals, and a controller configured to regulate communication from the communication network to the communication terminal. The controller is configured to screen incoming communications differently based upon which of a plurality of conditions the mobile communication unit is in and based upon sources of the communications.

Implementations of the invention may include one or more of the following features. A selector can be configured to be actuated to set the condition of the mobile communication unit. The selector can be configured to be actuated to set the condition to one of a first, second, or third condition, wherein in the first condition, only communications from a first set of sources are allowed to actuate the mobile communication unit for establishing a communication connection between the source and the mobile communication unit, and wherein in the second condition, only communications from the first set of sources and a second set of sources are allowed to actuate the mobile communication unit for establishing a communication connection between the source and the mobile communication unit. In the third condition all communications may be allowed to actuate the mobile communication unit for establishing a communication connection between the source and the mobile communication unit.

Embodiments of the invention further include a mobile communication terminal configured to communicate wirelessly with a communication network that is configured to receive signals from mobile units, transfer data within the network, and transmit the signals to the mobile units. The mobile communication unit includes a transmitter configured to send communication signals, a dedicated actuator selection of which initiates an attempt to communicate with an emergency service provider, a memory that stores a message, the message is at least one of an audio message and a text message providing identifying information regarding a user of the mobile communication unit, and a controller coupled to the transmitter, actuator, and memory, and configured to cause the transmitter to transmit the message toward the emergency service provider if communication is established between the device and the emergency service provider.

Implementations of the invention can include one or more of the following features. The message can provide identifying information regarding a user of the mobile communication unit, the mobile communication unit being further configured to determine a location of the mobile communication unit and to cause the transmitter to send location information toward the emergency service provider in association with the message. The message can be an audio message, wherein the mobile communication unit comprises a global positioning system to determine the location, wherein the mobile communication unit further comprises a text-to-speech translator, and wherein the mobile communication unit is configured to send translated audio corresponding to the location information toward the emergency service provider after sending the message toward the emergency service provider.

Embodiments of the invention further provide a communication terminal configured to communicate with a communication network that is configured to receive signals from communication units, transfer data within the network, and transmit the signals to the mobile units. The mobile communication terminal includes a positioning system configured to determine a location of the mobile communication unit and a controller configured to determine if a request to send location information regarding the location of the communication unit is authorized and to actuate sending of the location information toward a recipient if the request is authorized.

Implementations of the invention can include one or more of the following features. The controller can be configured to actuate sending of the location information toward a source of the request as the recipient. The controller can be configured to actuate sending of the location information toward a third-party destination, indicated by the request, as the recipient. The mobile communication terminal can be configured to actuate sending the location information substantially without providing an indication to a user of the mobile communication unit of the actuation of the sending. The mobile communication terminal can be configured to actuate sending the location information without providing a concurrent audible or visual indication to a user of the mobile communication unit of the actuation of the sending.

BRIEF DESCRIPTION OF THE DRAWINGS

A more complete understanding of the present invention may be derived by referring to the detailed description when considered in connection with the following illustrative figures. In the following figures, like reference numbers refer to similar elements and steps.

FIGS. 10A-B are a flow diagram of a process for sending a remote unit's location to a third party;

FIGS. 13-17 are interface menus for task management operations; and

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF PREFERRED EMBODIMENTS

The present invention is described partly in terms of functional components and various processing steps. Such functional components may be realized by any number of components configured to perform the specified functions and achieve the various results. For example, the present invention may employ various elements, materials, communication systems, positioning systems, control systems, user interfaces, and the like, which may carry out a variety of functions. In addition, the present invention may be practiced in conjunction with any number of applications, environments, communication hierarchies and organizations, and levels of implementation, and the systems described are merely exemplary applications for the invention. Further, the present invention may employ any number of conventional techniques for manufacturing, assembling, communicating, and the like.

Figure 1:
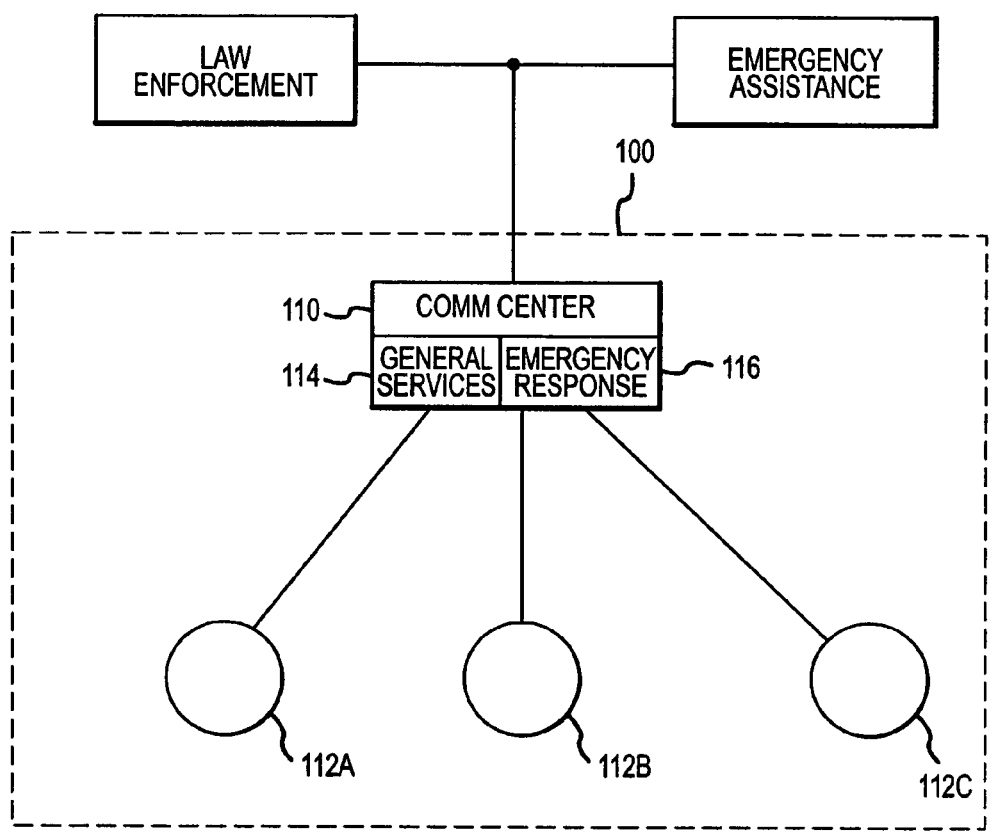
FIG. 1 is a block diagram of a communication system according to various aspects of the present invention.

Referring now to FIG. 1, a communication system 100 according to various aspects of the present invention may be implemented in conjunction with a communication center 110 and one or more remote units 112A-C. The communication center 110 communicates with and provides services to the remote units 112, such as general assistance and emergency assistance. The remote units may communicate with the communication center 110, other remote units 112, and other communications systems, such as telephones, computer networks, and positioning systems.

The communication center 110 may comprise any suitable operation for communicating with the remote units 112 and providing relevant services to the remote units 112, such as providing dispatching orders, receiving job completion information, providing contact information, addresses, or directions, connecting remote units 112 to other remote units 112 or communication systems, dispatching assistance, providing database access, or alerting government authorities. For example, the communication center 110 may provide general assistance and emergency assistance services. The communication system 100 may include multiple service centers 110 which may be interconnected or independent. In various embodiments, a particular metropolitan area may be serviced by one or more service centers 110, a single communication center 110 may provide services to an entire nation, or a major communication center 110 may supervise the provision of services by other lower level service centers 110 in other areas. The service centers 110 and the services provided may be configured in any suitable manner according to any appropriate criteria, such as geography, availability of communications, needs for particular services, and the like.

In the present embodiment, the communication center 110 comprises a general services center 114 and an emergency response center 116. The general services center 114 provides non-emergency assistance, such as directory assistance, directions to requested locations, technical support, hospitality information, or dispatching non-emergency roadside assistance. The emergency response center 116 responds to emergency requests and notifications, such as notifying law enforcement 102, requesting emergency medical or fire control assistance 104, alerting government authorities, providing advice and assistance, and the like.

The communication center 110 may be configured in any appropriate manner to provide the relevant services. For example, the communication center 110 may include personnel and systems for responding to anticipated emergencies, such as robberies, kidnappings, medical emergencies, bomb threats, fires, and the like. The communication center 110 may also have access to individual information, such as biographies, medical information, and emergency contact information for subscribers, as well as general databases, such as maps, emergency contact information for a particular area, and the like.

The communication center 110 provides information and assistance to users of the remote units 112. The remote units 112 may be connected to the communication center 110 and/or other systems via any appropriate medium, such as analog or digital radio frequency (RF) communications. In the present embodiment, the remote units 112 are connected to the services center 110 and other systems, such as conventional telephone systems, by cellular communications. In particular, the remote units 112 suitably operate as conventional cellular telephones, as well as perform additional functions.

Figure 2:
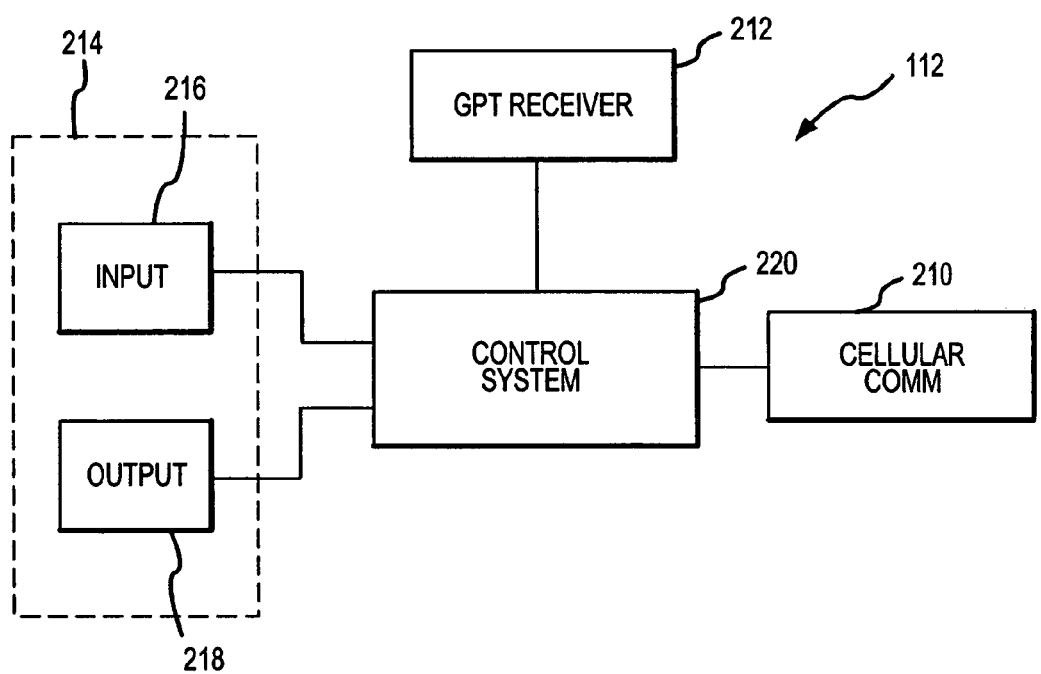
FIG. 2 is a block diagram of a remote unit.

The remote units 112 may be configured in any suitable manner according to the functions to be performed by the particular remote unit 112. For example, referring to FIG. 2, a remote unit 112 suitably comprises a remote communication system 210, a positioning system 212, a user interface 214 comprising an input interface 216 and an output interface 218, and a control system 220. The remote communication system 210 facilitates communication with the communication center 110 and other systems, and the positioning system 212 determines the position of the remote unit 112. The user interface 214 facilitates the exchange of information between the remote unit 112 and the user, and the control system 220 controls the overall operation of the remote unit 112.

More particularly, the control system 220 implements various functions in accordance with data received from the communications system 210, the positioning system 212, and the user interface 214. The control system 220 may comprise any suitable system for controlling the remote unit 112, such as a microprocessor, microcontroller, a logic system, or any other suitable system for controlling the operation of the remote unit 112. In addition, the control system 220 may be integrated or embedded into another system, such as the positioning system 212 and/or the remote communication system 210.

The remote communication system 210 facilitates communication between the remote unit 112 and other systems. The remote communication system 210 may comprise any appropriate system for facilitating communication with other systems. In the present embodiment, the remote communication system 210 comprises a cellular communication chipset, such as a GSM or CDMA chipset. In addition, the remote communication system 210 suitably facilitates communication of digital data, such as in conjunction with a packet-based system like a General Packet Radio Service (GPRS). The remote communication system 210 may also facilitate communication of other forms of data, such as video data and the like, or other communication systems, such as satellite communications.

The positioning system 212 facilitates determination of the position of the remote unit 112. The positioning system 212 may comprise any suitable system for determining the position of the remote unit 112, such as a global positioning system receiver. In the present embodiment, the positioning system 212 comprises a Motorola MG4100 instant GPS chip. The positioning system 212 may also or alternatively be separate from the remote unit 112. For example, the positioning system may comprise a triangulation system at the communication center 110 or elsewhere that determines the approximate location of the remote unit 112 by location pattern matching or according to the strength of or arrival time for the remote unit 112 signals relative to various cellular stations. The positioning system 212 may be located at any suitable location and may be implemented in any appropriate manner to determine the location of the remote unit 112.

The user interface 214 facilitates interaction between the user and the remote unit 112. The user interface 214 may comprise any appropriate system, suitably comprising an input interface 216 and an output interface 218. The input interface 216 receives information from the user, such as voice data, digital data, instructions, and the like. The input interface 216 may comprise any appropriate system for receiving information from the user, such as a microphone, a keypad, a voice recognition system, buttons, switches, dials, and the like. Similarly, the output interface 218 provides information from the remote unit 112 to the user, and may be configured in any suitable manner to provide information to the user. For example, the output interface 218 may comprise a speaker, an earpiece, a display, and the like. In addition, the input interface 216 and the output interface 218 may be fully or partially integrated, for example using a touch-screen display for both displaying information and receiving input signals.

Figure 3A:
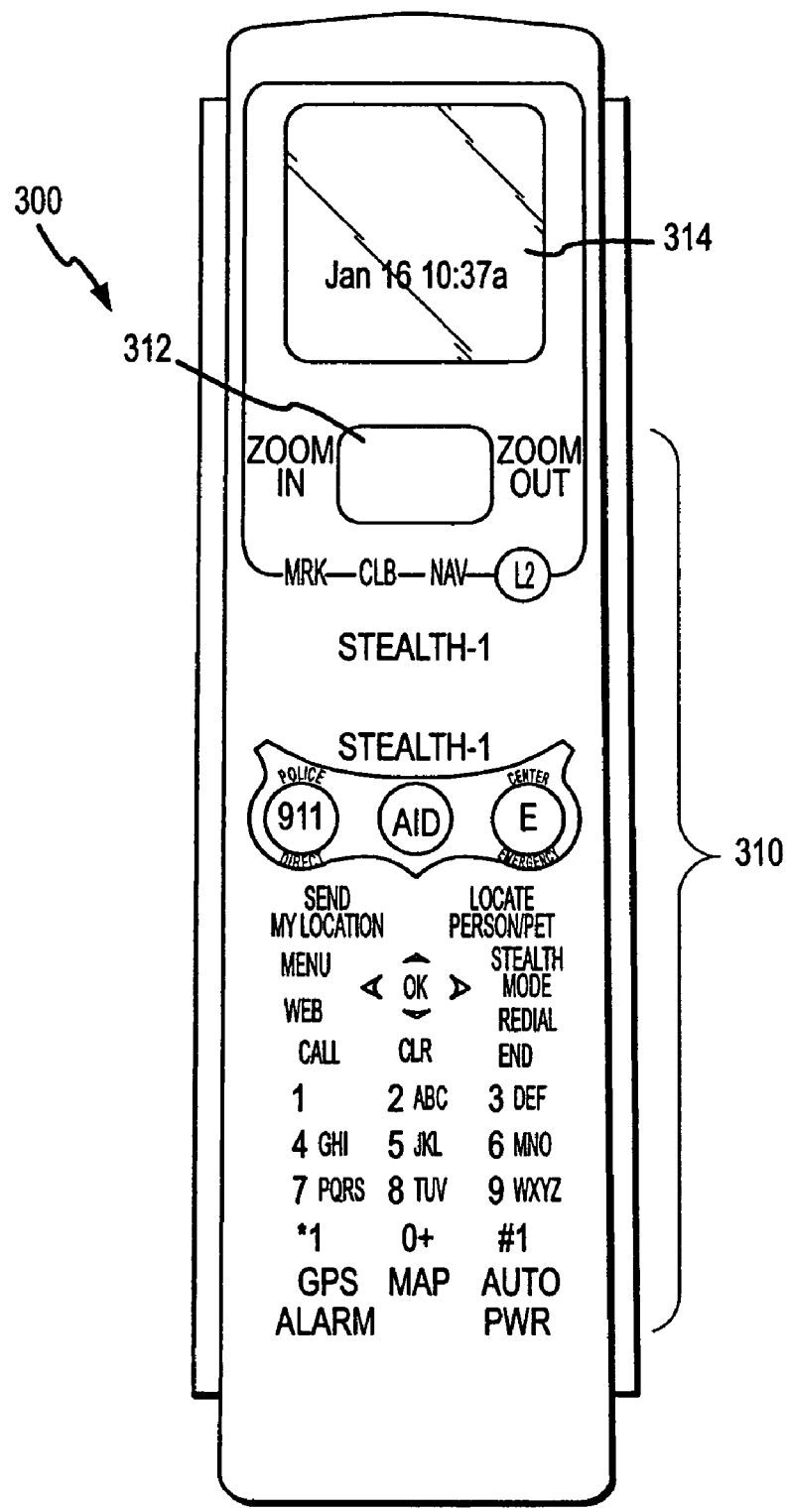
FIGS. 3A-H are illustrations of various remote units.

Referring to FIG. 3A, in the present embodiment, a master remote unit 300 according to various aspects of the present invention comprises a flip-open or clamshell style casing, although the master remote unit 300 may be configured in any suitable manner. The user interface 214 includes a keypad 310, a speaker 312, and a display 314. The speaker 312 suitably comprises a conventional speaker for conveying audio signals or other system for generating sound. The display 314 comprises any suitable system for displaying visual information, such as a conventional liquid crystal display. The keypad 310 comprises an array of buttons having various functions, including a numeric keypad and various specialty keys. The master remote unit 300 may also be equipped with any other desired features, such as a mirror (not shown) that may be used as a signal mirror, a vanity mirror, or any other desired purpose. In addition, the master remote unit or other remote units 112 may include decorative features, such as an interchangeable faceplate 332 (see FIG. 3C). The faceplate 332 may be configured to receive favorite pictures, designs, or the like.

In the present embodiment, the input interface 216 facilitates activation of selected special functions, for example via selected buttons or voice commands. Button, switches, dials, or other controls may be positioned in any suitable location on the master remote unit 300, such as on the front and sides. The special functions may include any appropriate functions for assisting the user and/or providing information to the communication center 110. For example, the special functions may include requesting law enforcement emergency assistance, requesting service center emergency assistance, requesting non-emergency assistance, sending position data to a different remote unit 112 or other system, requesting location data from another remote unit 112, activating a monitoring mode, or activating an alarm.

The communication system 100 may also operate using different types of remote units 112 having different functions. For example, in the present embodiment, the communication system 100 may include a hierarchy of remote units 112 such that each level of the hierarchy corresponds to different functions. In the present embodiment, a master remote unit 112A may be configured with a full complement of functions, including assistance request functions, tracking functions, secure communication functions, and data communication functions. Secondary remote units 112B, C are configured for restricted functionality according to their level in the hierarchy. For example, a secondary remote unit 112B may be configured with assistance request functions, but restricted tracking functions or none at all.

In one embodiment, the communication system 100 is configured for family use having a master remote unit 112A, for example for a parent, and various secondary remote units 112B, C, such as an adolescent remote unit, a child remote unit, and a pet remote unit. Each of the secondary remote units 112B, C is suitably configured with functions adapted for the particular intended user. For example, the adolescent remote unit 112B may include full cellular communication functions and assistance request functions, but restricted or no tracking functions. The child remote unit 112C may have its cellular communication functions limited to selected numbers, such as parent or guardian contact numbers and school contact numbers, and include assistance request functions. The pet remote unit may be configured to omit all cellular dialing functions, but may respond automatically to calls to provide tracking information to a master remote unit. The master and secondary remote units may be configured, however, according to the particular application, such as for technical field forces, sales forces, trucking, outdoor sports such as hiking, climbing, fishing, boating, flying, hunting, cycling, and the like. Each remote unit 112 may be configured with one or more selected other functions, for example functions associated with conventional cellular telephones, such as cellular communications, numeric dialing, power activation, redialing, ring control, menu listing, and other control functions.

The various remote units 112 may be configured in any suitable manner to perform desired functions. The master remote unit suitably provides various functions that allow the user to control, track, contact, or otherwise control communications with and operations of the various remote units 112. Referring still to FIG. 3A, an exemplary master remote unit 300 of the present embodiment for a parent may perform various functions, such as for tracking other remote units 112 for children and/or pets, contacting the communication center 110, or contacting authorities. The present master remote unit 300 includes dedicated buttons for one or more of the various functions, though the functions may be implemented according to any suitable activation process, such as voice activation, activation via menus, combinations of numeric buttons, and the like.

In the present embodiment, the master remote unit 300 has several capabilities that distinguish the master remote unit 300 from one or more of the secondary remote units, such as a LOCATE SECONDARY UNIT function to determine the position of selected secondary units, a SEND REMOTE UNIT LOCATION function for transmitting the location data for a secondary remote unit to a third party, an encrypted voice and data communication function, a location mapping function, speaker phone, and/or other functions. The master remote unit 300 may be configured, however, with any appropriate functions, for example functions corresponding to a higher level in a hierarchy or organization. The master remote unit 300 may also be configured, for example at the user's option, to selectively allow tracking of the master remote unit 300, such as by the communication center 110, other remote units 112, third parties, and the like. Thus, if the user wishes to allow tracking of the master remote unit 300, such as to allow tracking by emergency personnel, the feature may be enabled. The user may, however, disable the tracking function to maintain privacy.

In the present embodiment, secondary remote units 112 may include specialty units, such as adolescent, child, and pet units. The specialty units operate in conjunction with the master remote unit 300 and suitably respond to the master remote unit 300 and/or the communication center 110. The secondary units may have any appropriate functions according to the intended user and/or the remote unit's position in the hierarchy or organization. For example, the secondary units may be configured such that the master remote unit 300 may always track the secondary units, and the tracking response by the secondary unit may only be disabled with the authorization of the master remote unit. In addition, the secondary units may be configured with limited functions, such as limiting dialing to selected numbers or eliminating the ability to track other unit, and/or may be configured with additional functions, such as a direct RF connection to the master remote unit 300.

Figure 3B:
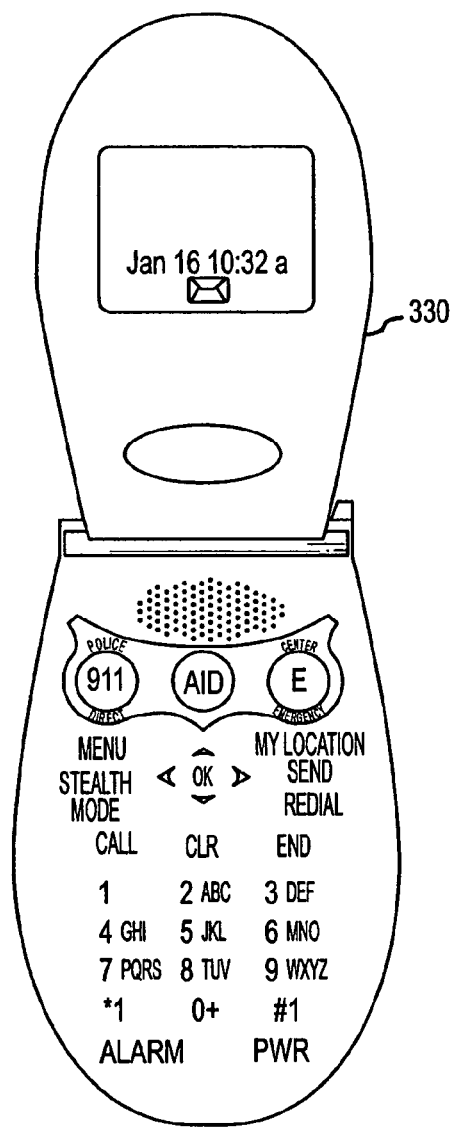
Figure 3C:

For example, referring to FIG. 3B and 3C, an adolescent remote unit 330 according to various aspects of the present invention comprises a cellular telephone having a limited number of functions relative to the master remote unit 300. In particular, the adolescent remote unit 330 may be configured with various functions, including full-capability cellular communications, assistance request functions, a monitoring mode for receiving tracking requests, and a send unit location function.

The adolescent remote unit 330 may also be configured to respond to tracking requests, for example from the master remote unit 300 or, if authorized, the communication center 110. The tracking request response function is suitably configured so that it cannot be disabled without authorization from the master remote unit 300 or authorized personnel. For younger users, the adolescent remote unit 330 may be locked in a closed position, for example using a thumbwheel lock 334, to further limit the functions of the adolescent remote unit 330.

Figure 3D:
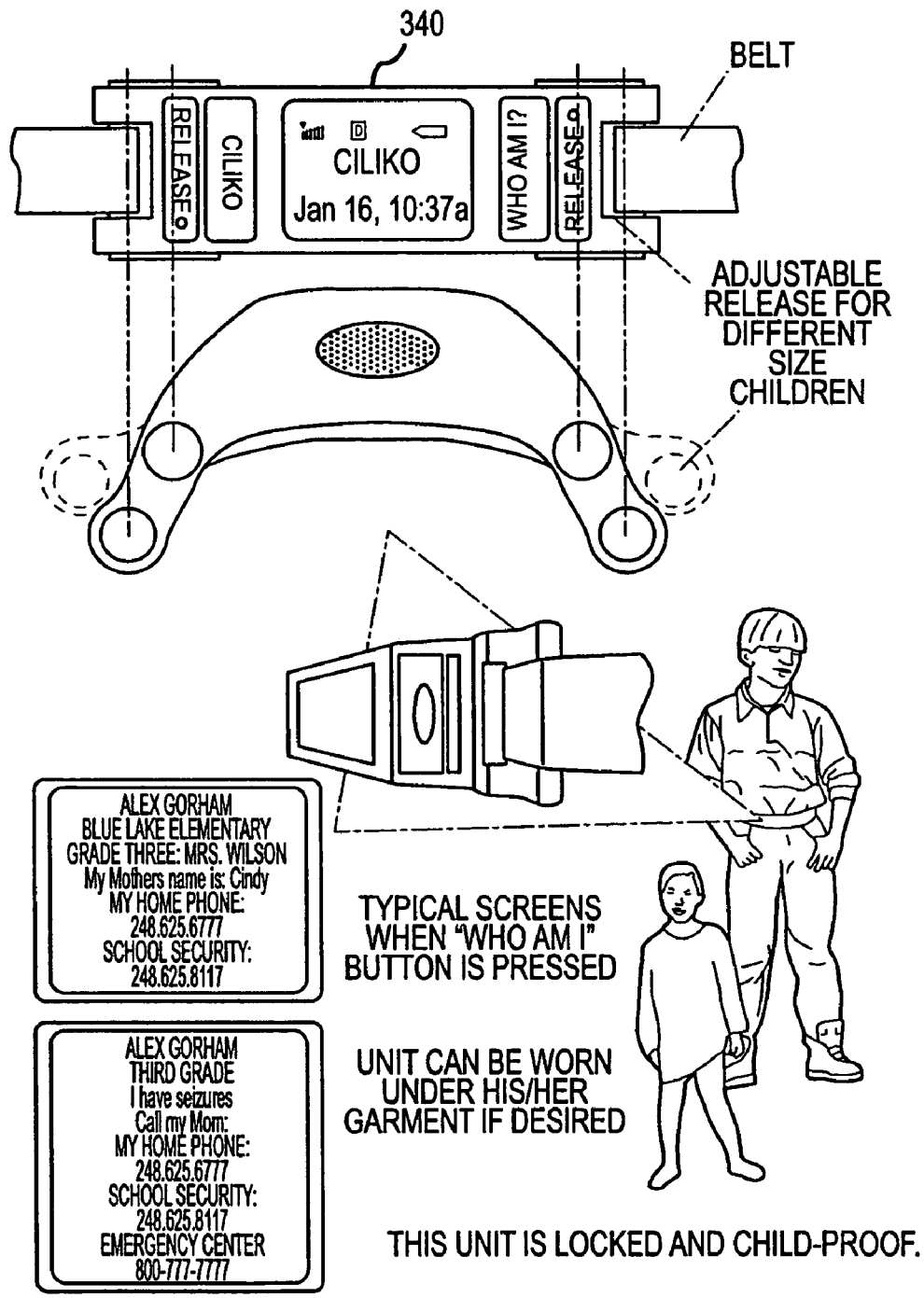

Referring to FIG. 3D, a child remote unit 340 is suitably configured to allow the child remote unit 340 to be tracked by the master remote unit 300 and to provide selected information to third parties. The child remote unit 340 is suitably configured to be attached to the child's clothing or accessories, such as a backpack or belt. The child remote unit 340 may include a remote communication system for making connections, such as cellular connections with the master remote unit 300 and/or the communication center 110 to facilitate location tracking. The child remote unit 340 may also be configured with a display or nameplate providing identification, medical, contact, and other information. An electronic display containing such information may be activated by a third party or the child, such as by depressing a large dedicated button.

The various functions for the child remote unit 340 may be configured particularly for use by children within a selected age group or for others that may require supervision or monitoring, such as an elderly or infirm person. For example, the child remote unit 340 may be configured to allow telephone calls only to selected telephone numbers, such as telephone numbers for parents, school authorities, and/or emergency services, for example via a set of auto-dialing options. The auto-dialing functions may be pre-programmed, such as 9-1-1 for emergencies, programmable by authorized personnel, such as the parent, or any appropriate combination. The child remote unit 340 is suitably configured to allow tracking by a corresponding master remote unit 300, such as a parent's master remote unit, but may not have any ability to track other remote units.

Figure 3E:
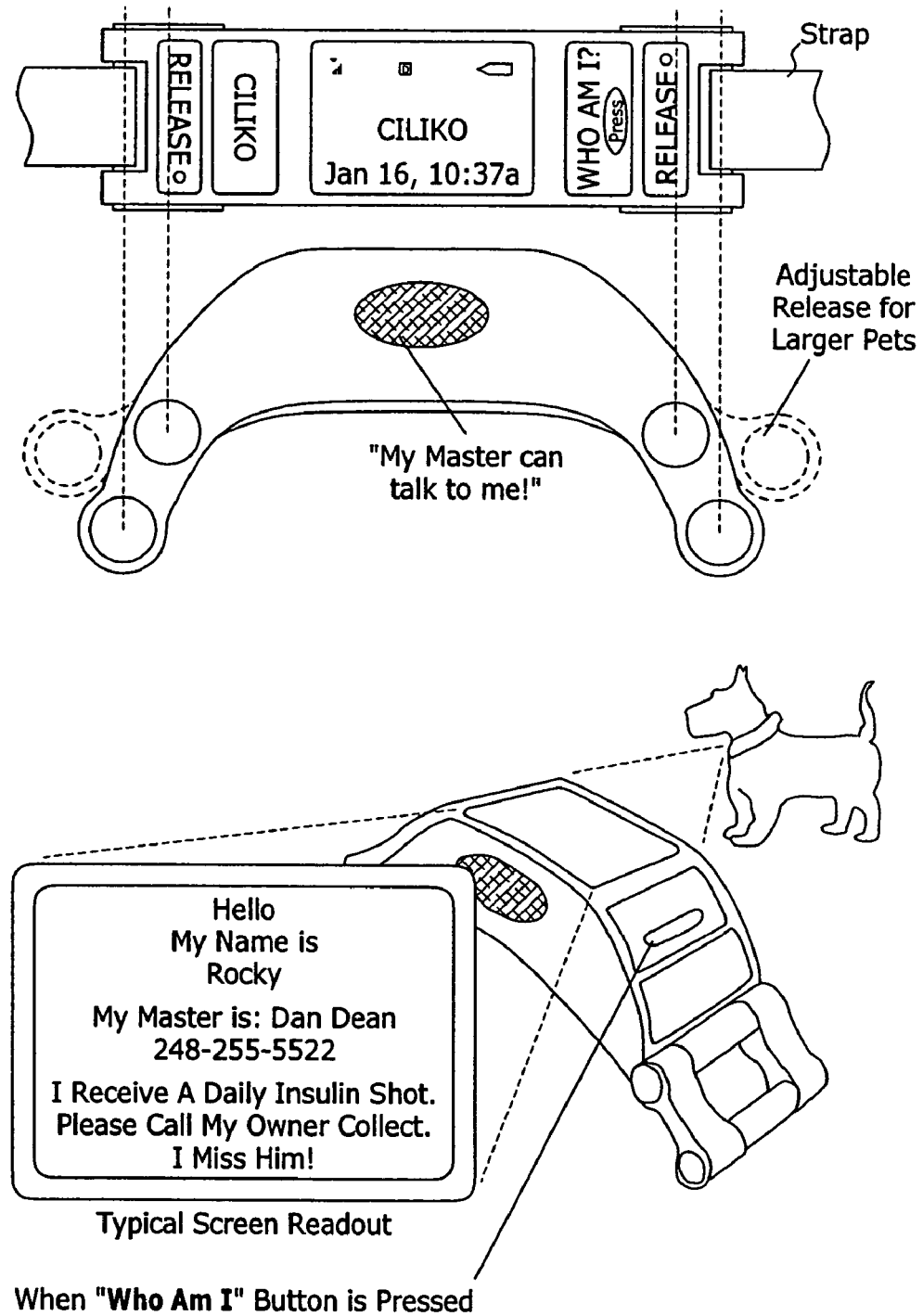

Similarly, referring to FIG. 3E, a pet remote unit 350 is suitably configured to attach to a pet, for example to the pet's collar or the like. The pet remote unit 350 may include a remote communications system for making remote connections, such as with the master remote unit 300 and/or the communication center 110 to facilitate location tracking. The pet remote unit 350 may also be configured with a speaker so that the master control unit 300 user may contact the pet remote unit 350 and provide vocal contact to the pet. The pet remote unit 350 may also be configured with a display or nameplate providing identification, medical, contact, and other information. The pet remote unit 350 can include a protective casing accessory that is crushproof and waterproof up to a specified depth, such as up to 50 feet in depth.

Figure 3F:
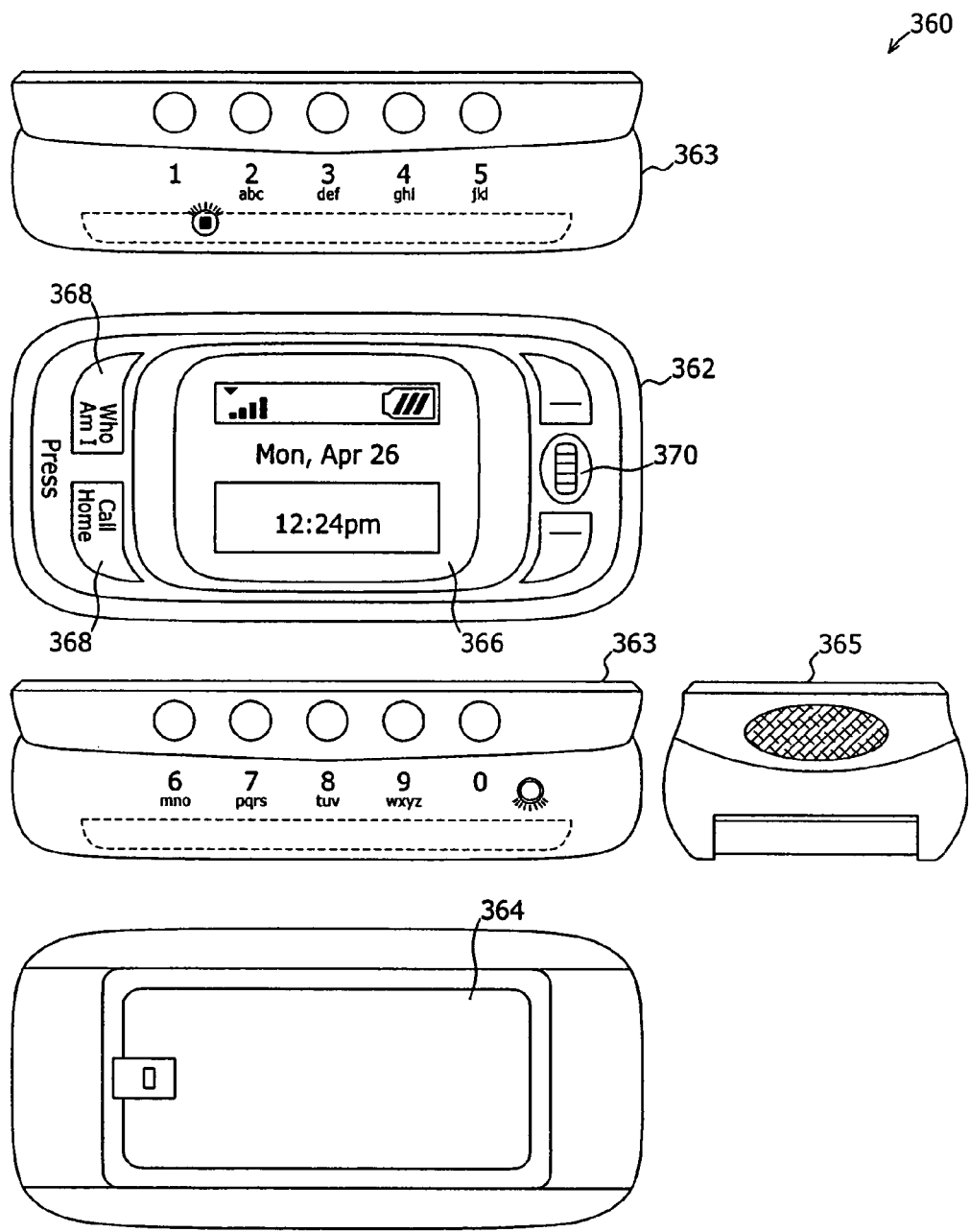

Referring to FIG. 3F, an alternative remote unit 360 can be used as a master remote unit or as another remote unit, such as an adolescent remote unit or pet remote unit. The remote unit 360 includes a front panel 362, side portions 363, a back panel 364 and a bottom auditory aperture 365. The front panel 362 includes a display screen 366, programmed buttons 368, and a turn dial 370. The programmed buttons 368 are preferably purpose specific. For example, here the programmed buttons include a "Who Am I" button that, when depressed, reveals stored information about the carrier, and a "Call Home" button programmed to automatically dial a home number when pressed.

Figure 3G:
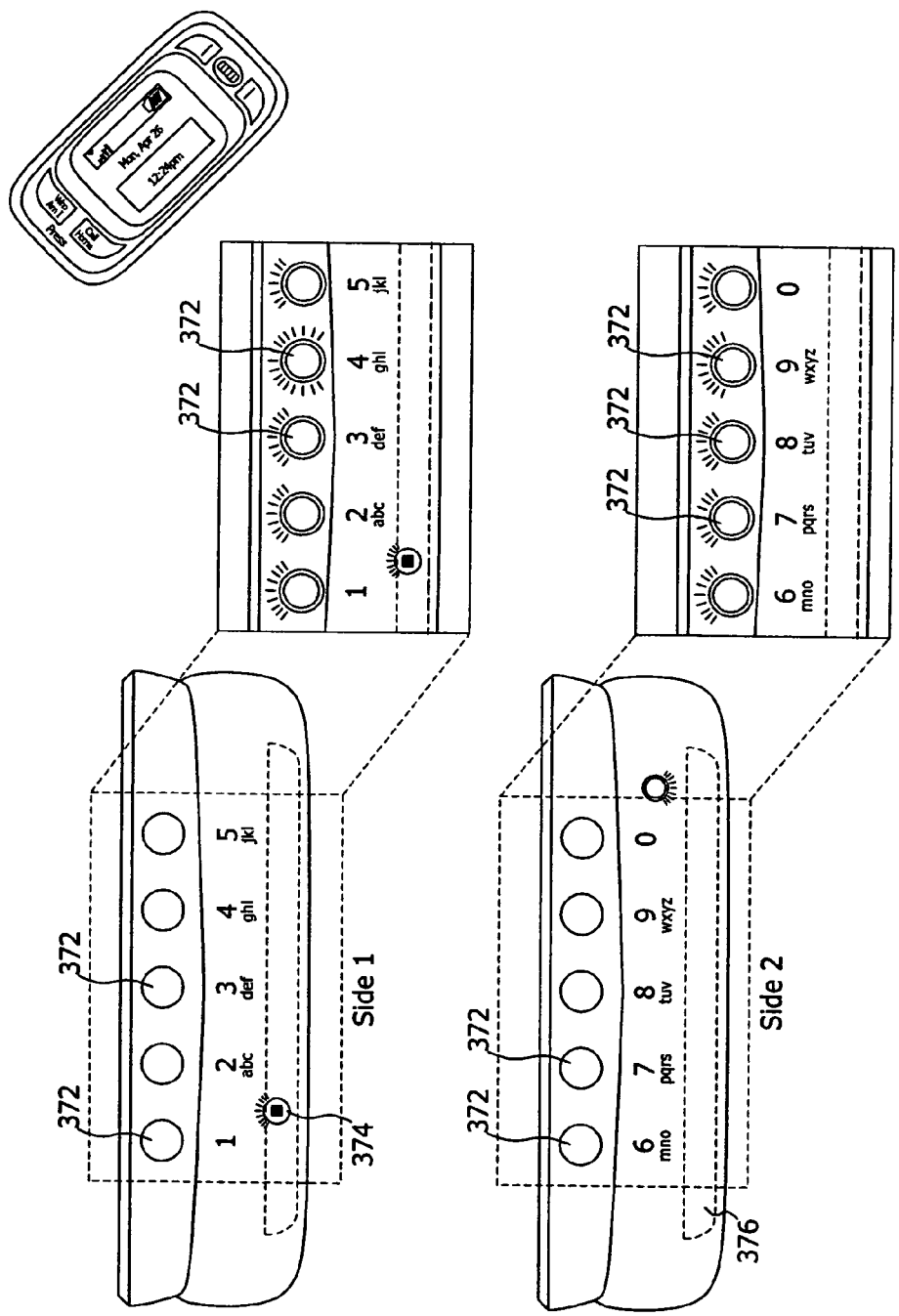
Figure 3H:
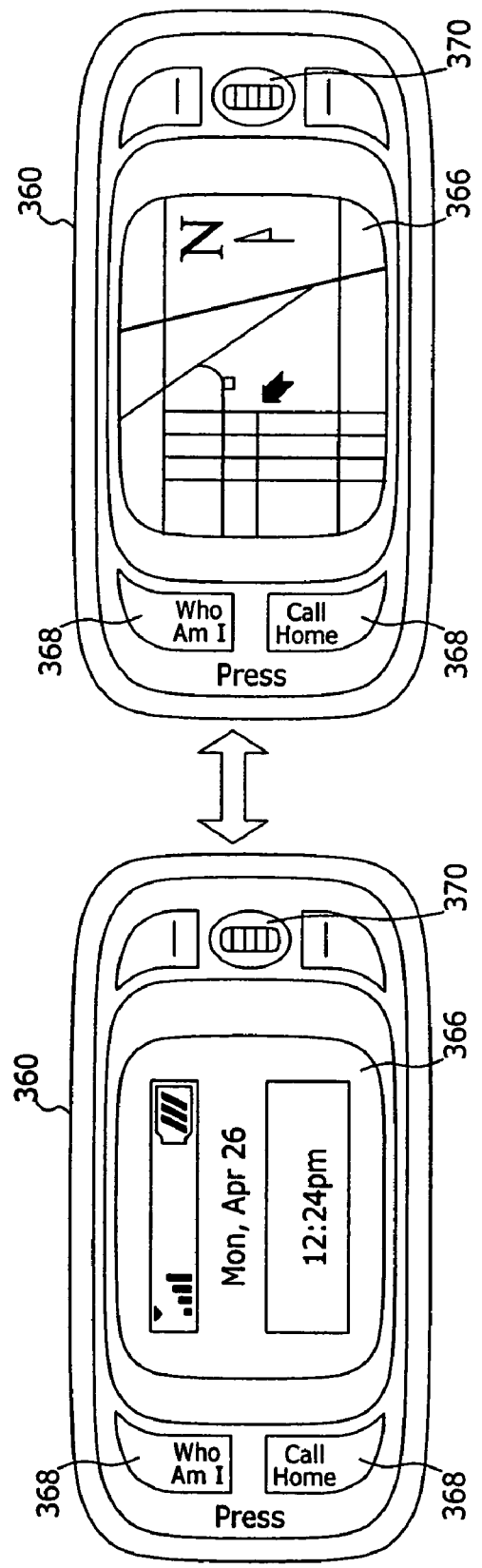

Referring to FIG. 3G, the remote unit 360 includes recessed cell phone keys 372, a charger connection 374, and an earpiece connection aperture 376. The recessed cell phone keys 372 are operationally standard, i.e., the recessed cell phone keys 372 can be used to dial a phone number. The recessed phone keys can operate according to a speed dial configuration. For example, the recessed key 372 labeled "1" can be configured to speed dial a guardian, key "3" programmed to speed dial an emergency center, key "4" to dial a school security center, and key "5" to dial the police. Further, additional keys can be activated to call programmed numbers, such as friends, and key "0" may be configured to activate an ALARM.

The particular functions accorded to the various remote units 112 may be selected according to the particular application and anticipated user. The various remote units 112 may be selectively configured with additional functions, such as a speaker, a GPS receiver and mapping system, zoom and navigation functions for the display, a second line switch, and a web browser. For example, with reference to FIG. 3G, the remote unit 360 can request location information of a second remote unit, and the location information will preferably be displayed on the display screen 366 as a map having position information. The remote units 112 may also be configured to request and receive downloads, for example to acquire new functions, correct defects, improve performance, and the like. In addition, the remote units 112 may be configured to be connected to networks, such as a Wi-Fi network or other data networks, using any appropriate communication technology, such as Bluetooth or the like. Networking capabilities may also be configured to connect to private networks, for example to facilitate access to corporate files and applications. In addition, the remote units 112 may be configured to operate with a cradle or other hardware connection to interface with a computer, a network, or other system. Further, the remote units 112 may be configured to transform a voice message into text and e-mail the text to an address designated by the user, and may transform text messages received into verbal form for audio playback. The information so transferred may be periodically downloaded and printed and/or electronically stored.

The remote units 112 are suitably configured to perform various assistance request functions. In the present embodiment, the remote unit 112 is configured to allow the user to request non-emergency assistance from an assistance resource, such as the general services center 114. The remote unit 112 may be configured in any suitable manner to request assistance, such as via an automatic dialing function, direct RF exchange, or the like. The remote unit 112 may also be configured to provide its location to facilitate assistance, either automatically or at the user's option.

Figure 4:
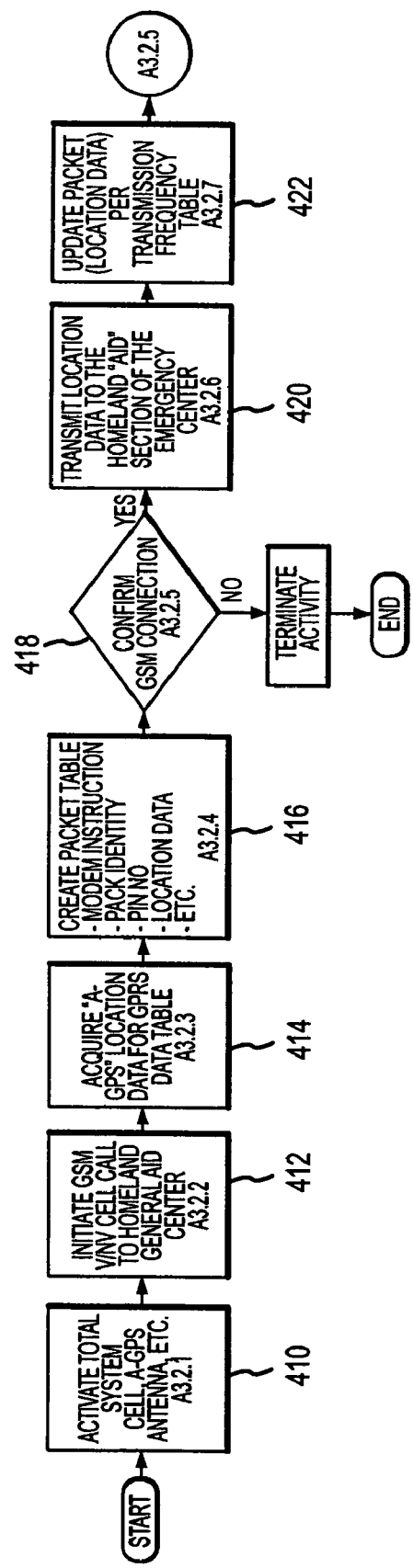
FIG. 4 is a flow diagram of a general service process.

For example, to request general non-emergency assistance, the user may depress the AID key on the remote unit 112. Referring to FIG. 4, the remote unit 112 suitably activates various components of the remote unit 112, if they are not already activated, such as the positioning system 212, the communications system 210, and any other relevant elements of the remote unit 112 (410). The remote unit 112 then suitably contacts the general services center 114, for example by automatically dialing the relevant contact number (412). The remote unit 112 may also retrieve positional information, such as GPS data from the GPS constellation (414). The remote unit 112 is also suitably configured to prepare data for transmission, such as identification information for the remote unit 112, location data, or other information that may be useful for the general services center 114 (416). When the connection with the general services center 114 is established (418), the information is transmitted to the general services center 114 (420), which may then be used to determine the location of the remote unit 112 and the identity of the user.

The general services center 114 uses the identity information in any suitable manner, for example to retrieve relevant user information from a database, such as the user's name, medical information, contact information, user preferences, preferred language, or other useful information. The general services center 114 may also establish a voice communication with the user, for example to determine the nature of the request. The general services center 114 may then use the retrieved information and/or the position information to assist in fulfilling the user's request, such as to dispatch roadside assistance to repair a vehicle, provide directions to a destination, provide information regarding useful merchants in the area, receive personal messages, obtain traffic information, news, weather forecasts, or emergency alerts, and the like. As the call continues, the remote unit 112 may automatically update the information provided to the general services center 114 (422), such as the positional data, so that the general services center 114 receives substantially current information.

Figure 5:
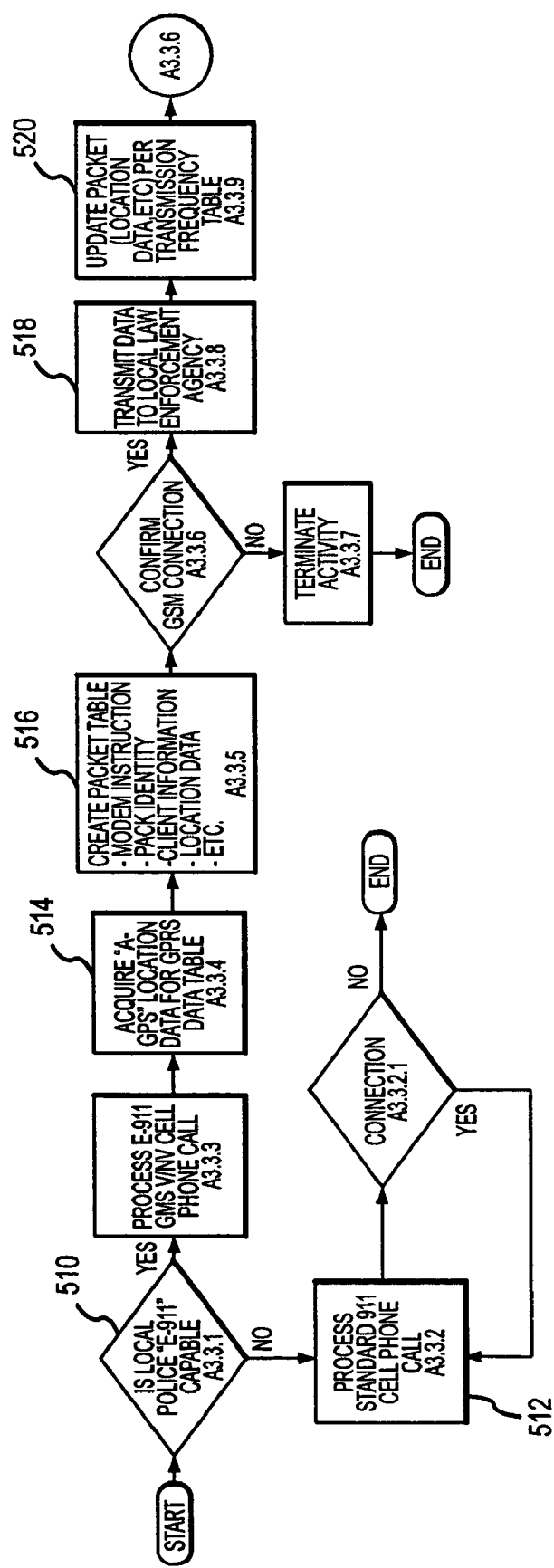
FIG. 5 is a flow diagram of an emergency law enforcement assistance request process.

For emergency assistance requests, the user may depress the POLICE 911 DIRECT button and/or the EMERGENCY CENTER button. Referring to FIG. 5, in response to the POLICE 911 DIRECT button activation, the remote unit 112 initiates contact with the local police emergency number. Initially, the remote unit 112 may determine whether enhanced emergency service is available that accepts positional data (510). If only standard emergency service is available, the remote unit 112 initiates a standard police emergency contact (512), such as by automatically dialing 9-1-1. If enhanced emergency service is available, the remote unit 112 retrieves positional data (514), for example via the GPS constellation (514).

The remote unit 112 also suitably prepares relevant information for transmission (516), such as user identification information and position information. The user identification information may comprise any suitable information that may be of interest to the authorities, such as the user's name, address, blood type, and the like. When the connection with the police has been established, the information is transmitted to the police (518) and the user may state the emergency assistance request verbally via the voice connection. The remote unit 112 is suitably configured to update the information transmitted to the police via the data connection (520), such as the positional data to maintain current information.

Figure 6:
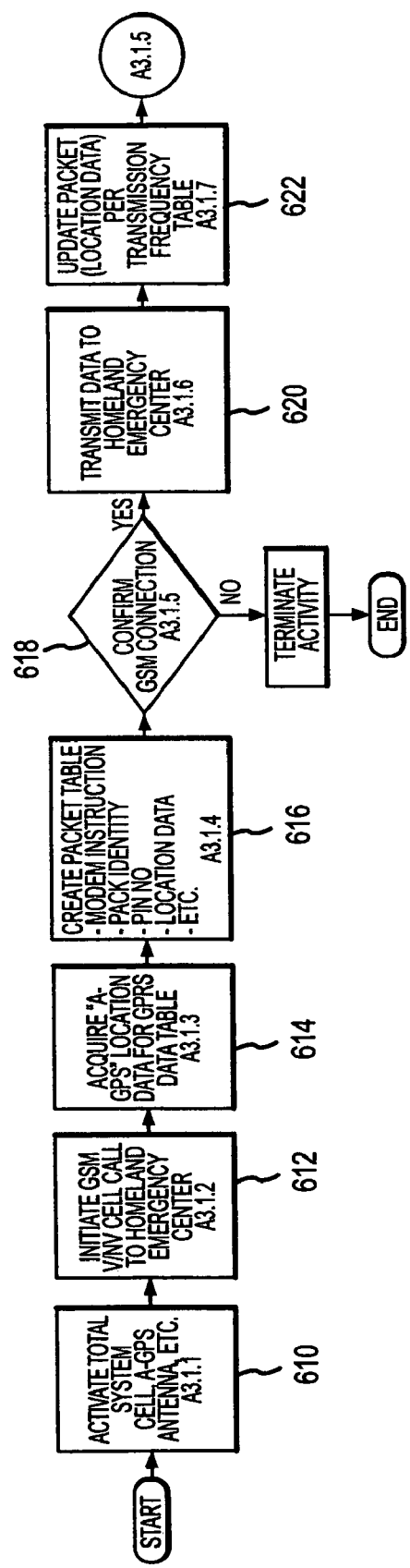
FIG. 6 is a flow diagram of a emergency assistance request process.

Referring to FIG. 6, in response to activation of the EMERGENCY CENTER button, the remote unit 112 suitably activates various components of the remote unit 112, if they are not already activated, such as the positioning system 212, the communications system 210, and any other relevant elements of the remote unit 112 (610). The remote unit 112 then suitably contacts the emergency response center 116, for example by automatically dialing the relevant contact number (612). The remote unit 112 also retrieves positional information, such as GPS data from the GPS constellation (614). The remote unit 112 is also suitably configured to prepare data for transmission, such as identification information for the remote unit 112, location data, or other information that may be useful for the emergency response center 116 (616).

When the connection with the emergency response center 116 is established (618), the information is transmitted to the emergency response center 116 (620), which may then be used to determine the location of the remote unit's 112 user and the identity of the user. The emergency response center 116 uses the identity information in any suitable manner, such as to retrieve relevant user information from a database. The general services center 114 may also establish a voice communication with the user, for example to determine the nature of the request. The emergency response center 116 may then use the retrieved information and/or the position information to assist in responding to the emergency, such as to direct the user to a hospital, dispatch emergency services, advise the user how to respond to the emergency, notify local authorities, and the like. As the call continues, the remote unit 112 may automatically update the information provided to the emergency response center 116 (622), such as the positional data, so that the emergency response center 116 receives substantially current information.

Figure 7:
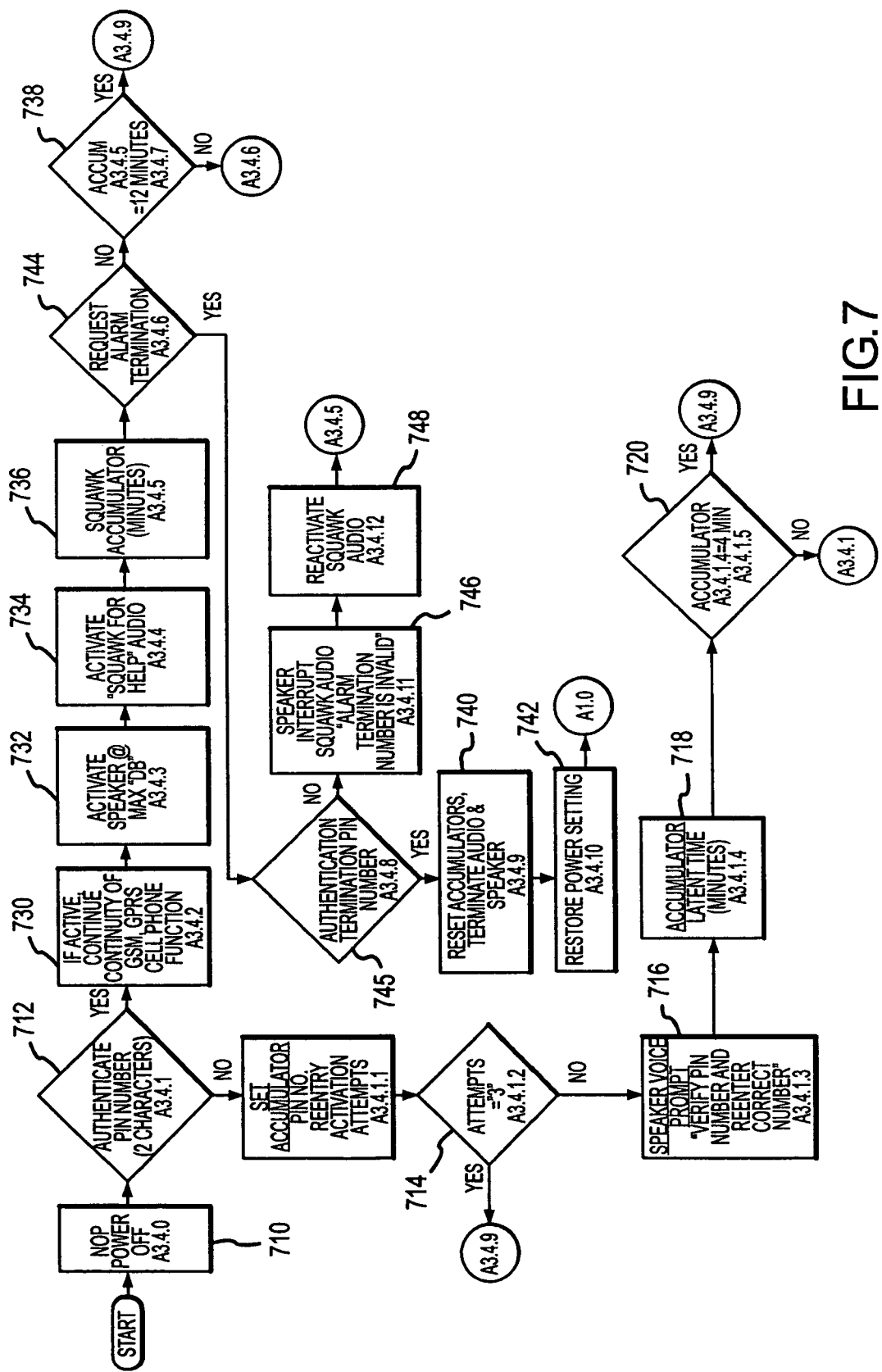
FIG. 7 is a flow diagram of an alarm process.

The user may also elect to activate an alarm on the remote unit 112 to attract attention and assistance. The remote unit 112 of the present embodiment suitably includes an ALARM key for quick activation of the alarm, or may respond to a voice command. The ALARM button is suitably positioned at a unique position with respect to more commonly used keys, such as at the bottom of the key pad, to avoid unintentional activation. Referring to FIG. 7, in response to activation of the ALARM button or a voice command to activate the alarm, the remote unit 112 may be configured to immediately disable the POWER button (710) so that the remote unit 112 cannot be turned off to silence the alarm. The remote unit 112 may also be configured to request an identification number or code word for activating the alarm (712). If the proper identification number is not entered, the remote unit 112 suitably prompts the user to enter the correct number (716). If the proper identification number is not entered within a selected number of attempts (714) or a selected time period (718, 720), the remote unit 112 may terminate the alarm process and restore functionality to the POWER button (740, 742).

If the proper identification code is entered, the remote unit 112 maintains the cellular communication functions (730) and activates the speaker at the maximum loudness (732). The remote unit 112 then activates an audible alarm (734), such as a siren. In the present embodiment, the alarm comprises a bird's screech, such as a call for help by a parrot or other bird, to attract attention. The remote unit 112 also sets a timer for the duration of the alarm (736). If alarm termination is not requested, the alarm continues until the timer expires (738), at which time the alarm is disabled (740) and the POWER button function is restored (742).

If alarm termination is requested (744), the remote unit 112 awaits entry of the identification number (745). If the proper identification number is provided, the remote unit 112 proceeds with terminating the alarm (740, 742). If the proper identification number is not entered, the remote unit 112 indicates that the number is invalid (746) and continues sounding the alarm (748) until the timer expires or the proper identification number is provided.

The remote unit 112 may also be configured to provide various tracking functions. In the present embodiment, one or more remote units 112 may be configured to allow the user to track the location of other remote units 112. The remote units 112 may be configured in any suitable manner to track other remote units 112 and/or limit tracking of remote units 112, such as by limiting access to location data to authorized users. The remote unit 112 may also be configured to provide tracking information to third parties, such as emergency personnel, either automatically, at the user's option, or at an authorized party's discretion.

Figure 8A:
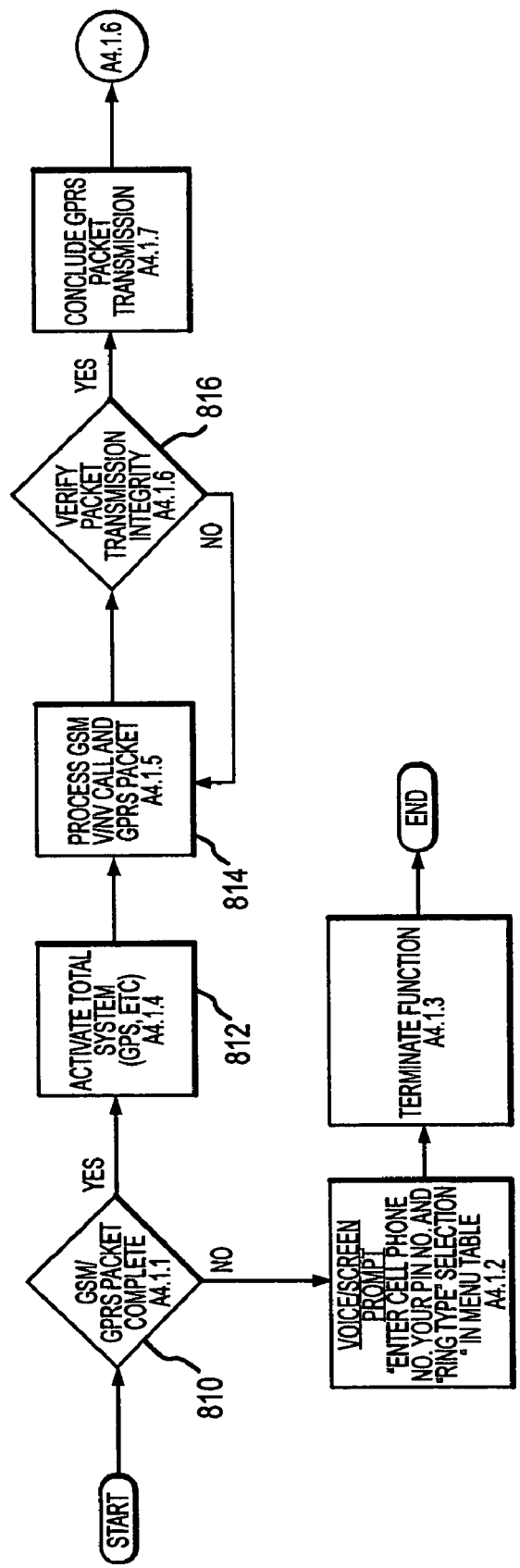
FIGS. 8A-C are a flow diagram of a locate remote unit process.
Figure 8B:
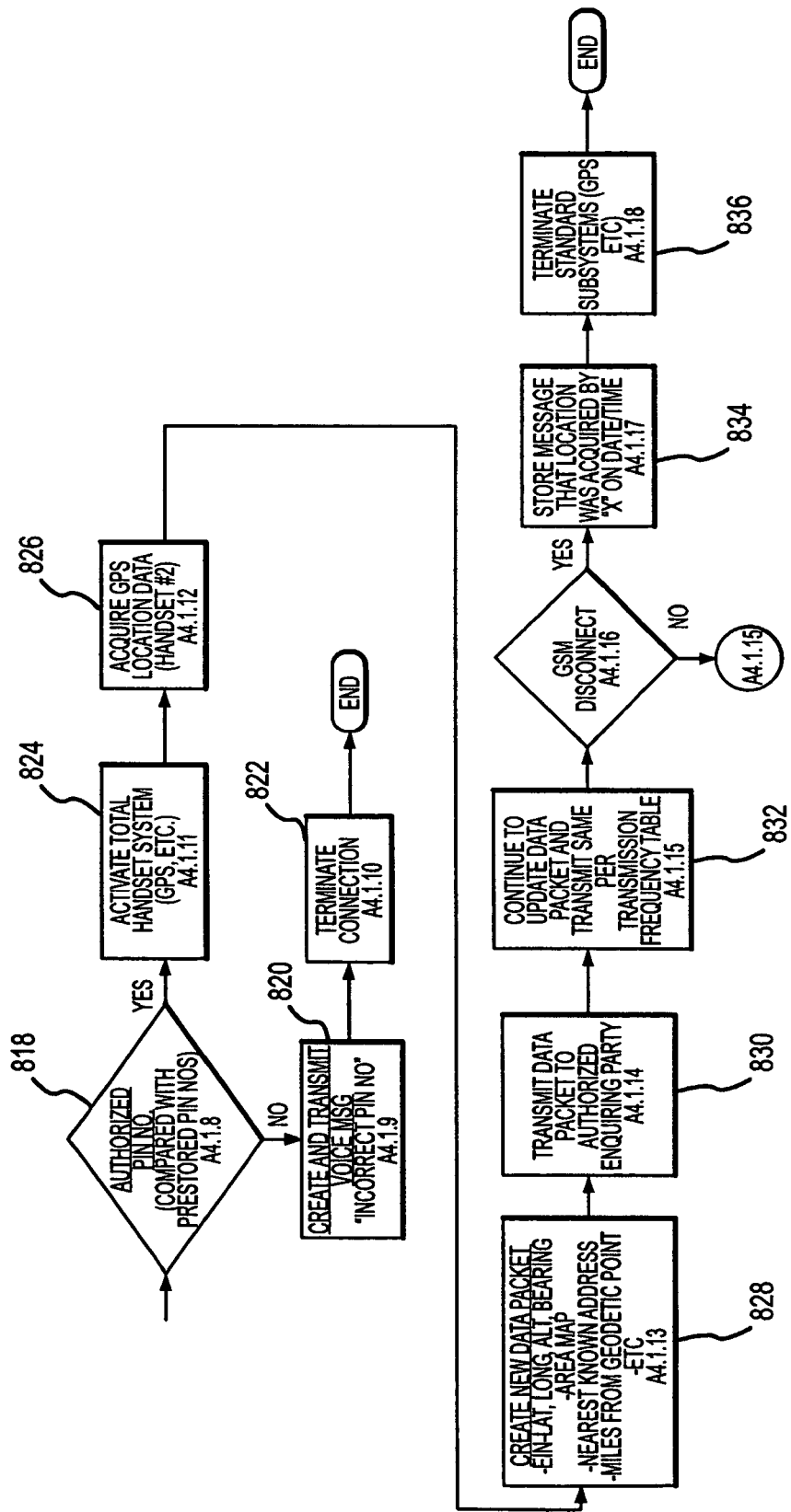

For example, a master remote unit 300 may be configured to locate a remote unit 112, such as a remote unit associated with a spouse, child, or pet, and display the location, such as on a map displayed on the display of the master remote unit 300. Referring to FIG. 8, to request the location of another unit, the master remote unit 300 receives a command from the user, such as via a designated button, combination of buttons, or a voice command. The user is then suitably prompted to enter an identifier for the remote unit 112 to be located, such as the particular unit's telephone number. The master remote unit 300 suitably assembles a data signal (810) for requesting the selected remote unit's location and activates the relevant portions of the master remote unit, such as the positioning system 212 and the communications system 210 (812). The master remote unit 300 then contacts the selected remote unit 112, suitably via a cellular telephone connection (814), and verifies the transmission's integrity (816).

The secondary remote unit receives the transmission. The secondary remote unit is suitably configured to selectively, for example according to an election made by the master remote unit 300 user, receive and respond to the transmission without notification, such as a ring or a flashing light. Upon receipt of the information transmission from the master remote unit 300, the communication system 100 is configured to provide the secondary remote unit's position to the master remote unit 300. In the present embodiment, the secondary remote unit responds by verifying authorization of the request, determining its current position and transmitting the position data to the master remote unit 300. For example, referring to FIG. 8B, the secondary remote unit 112 compares the received identification number to one or more stored authorization numbers (818). If the received number does not match any stored numbers, the secondary remote unit suitably provides a notification to the master control unit 300 (820) and terminates the connection (822).

If the request is authorized, the secondary remote unit 112 activates the relevant systems to fulfill the request, such as the positioning system 212 and the remote communication system 210 (824). The secondary remote unit 112 then determines its current position based on GPS data (826) and assembles a data packet comprising any suitable information, such as the position of the secondary remote unit, identification information, current speed and direction of travel, and the like (828). The data packet is then transmitted to the master control unit 300 (830). The secondary remote unit suitably continues to provide updated position information for a selected period or until the connection is terminated (832). When the transmission ends, the secondary remote unit 112 suitably stores a log entry indicating that the location data was requested and transmitted by the master remote unit 300 at the particular date and time (834). The secondary remote unit 112 may then return the relevant systems to their original state (836).

Figure 8C:
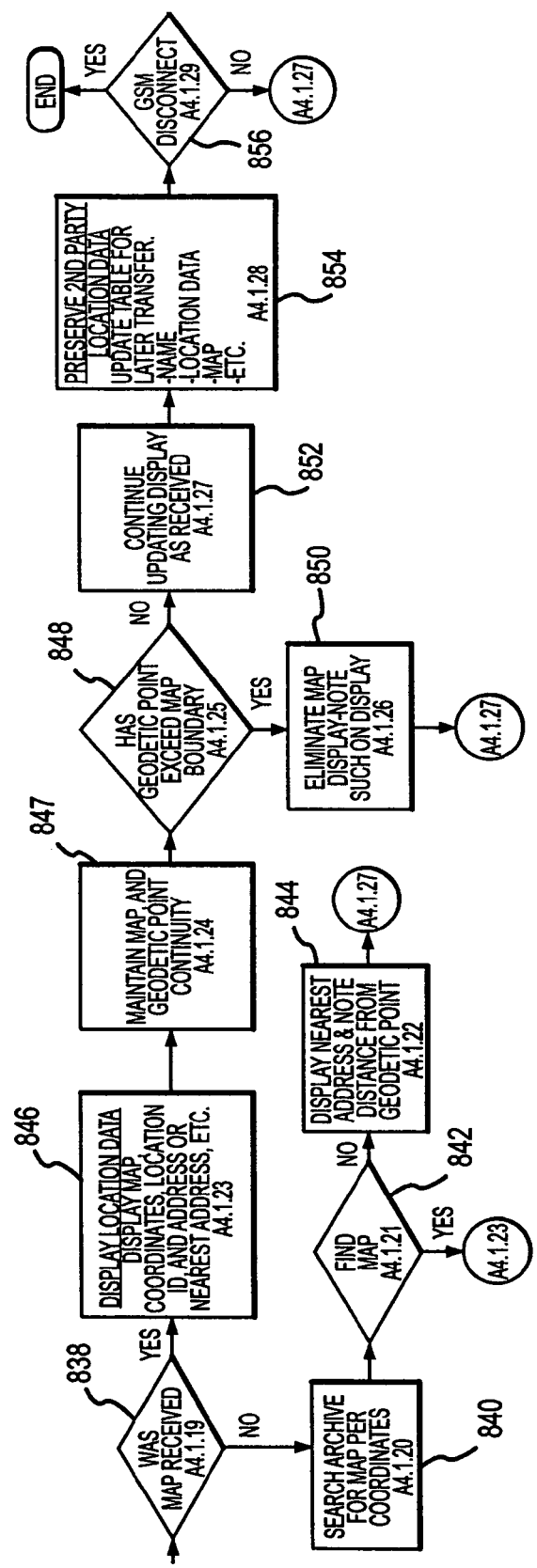

Referring to FIG. 8C, when the master remote unit 300 receives the position data from the secondary remote unit 112, the master remote unit 300 determines whether map data was received with the transmission (838). If not, the master remote unit 300 searches a database, such as an onboard or a remote database, for a map of the relevant location (840). If such a map is not found (842), the master remote unit 300 may display other relevant data that may assist the user, such as a reference point like nearest address or intersection and a distance and direction of the relevant location from the reference point (844).

If a map is received with the position data or is found in the database, the map is displayed along with the relevant location with respect to the map (846). Other information, such as the speed and direction of travel, may also be displayed. The position of the remote unit 112 with respect to the map, as well as the map itself, may be updated over time (847). If the relevant location is beyond the map boundary (848), the map may be eliminated (850). The position data on the display is updated as it is received (852), and the data is stored (854). The master remote unit 300 continues to update the location information until the connection is terminated (856).

Figures 9A, 9B:
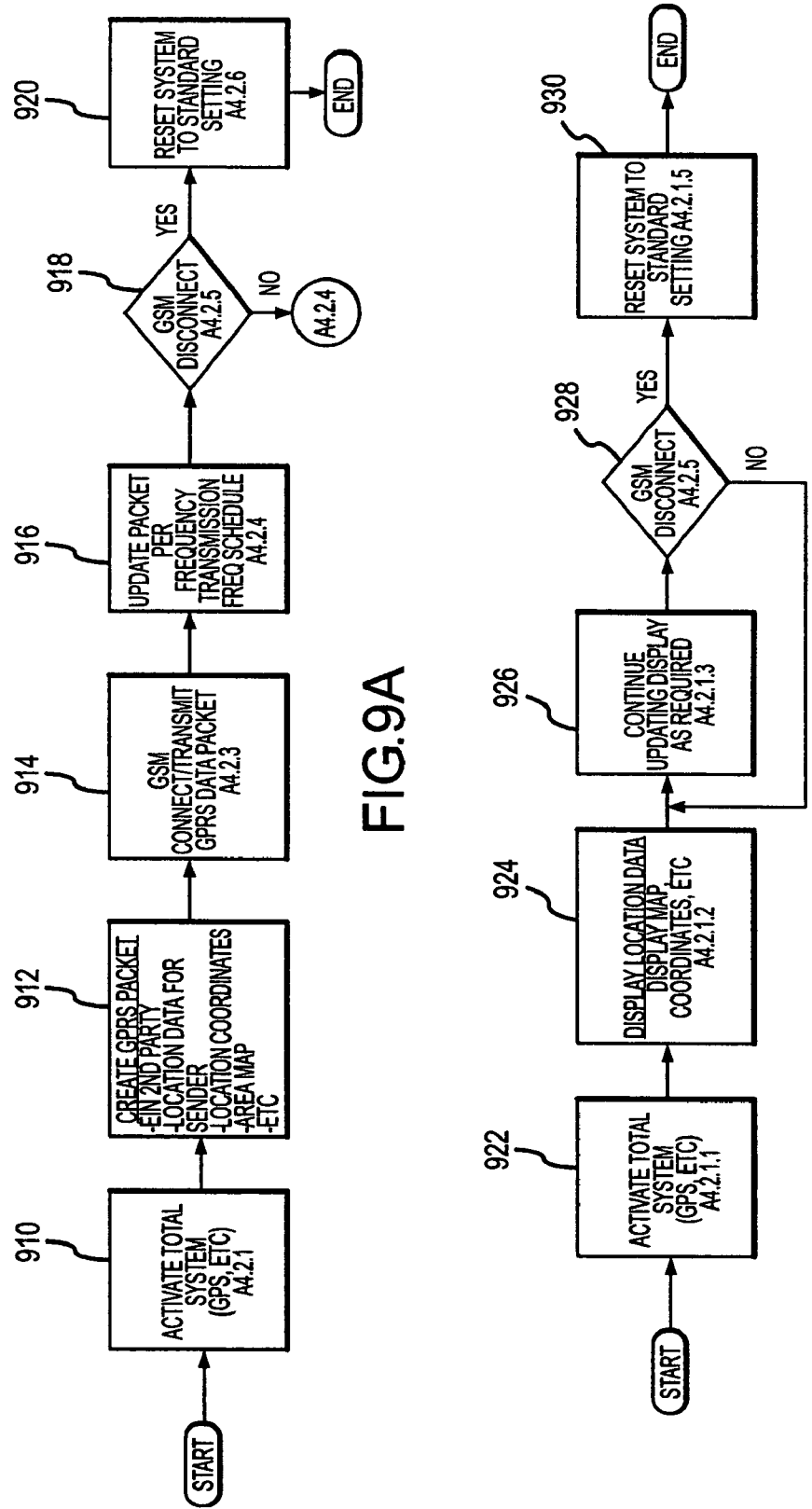
FIGS. 9A-B are a flow diagram of a send remote unit location process.

A first remote unit 112 may also be configured to voluntarily transmit its location data to a second remote unit, for example by contacting the second remote unit 112 and transmitting the position data. In the present embodiment, the first remote unit 112 may be configured to send its location data to the second remote unit in response to a signal, such as depression of the SEND MY LOCATION button or a voice activation signal. The SEND MY LOCATION request may be accompanied by an identifier for the second remote unit 112, such as a telephone number for the second remote unit 112. Referring to FIG. 9A, the first remote unit 112 suitably activates relevant elements of the remote unit or the full system (910), including the positioning system 212 and the remote communication system 210. The first remote unit 112 identifies its position and prepares a data packet including relevant information, such as identifier information for the first remote unit 112 and the position data (912). The first remote unit 112 then contacts the second remote unit 112, such as via cellular connection, and transmits the data packet (914). The data transmitted may be updated and retransmitted at selected intervals (916). When the connection is terminated (918), the first remote unit may be returned to its original state (920), for example deactivating systems that were originally inactive to reduce power consumption. The connection may be terminated at the same time as a voice connection or may be terminated independently.

The second remote unit 112 may also be suitably configured to receive the position data from the first remote unit and provide the information to the user. Referring to FIG. 9B, the second remote unit 112 responds to the incoming data by fully activating the system or the relevant elements (922). When the data packet is received, the second remote unit 112 displays information relating to the first remote unit's 112 position, such as a map with the location of the first remote unit superimposed on the map (924). The position information provided to the user is updated (926) until the connection terminates (928). The second remote unit 112 may then revert to its original state (930).

A remote unit 112 may also be configured to transmit the location of another remote unit 112 to a third party. For example, a parent may wish to transmit the location of a child's remote unit to a spouse or an emergency unit. The first remote unit 112 is configured to acquire the second remote unit's position and forward the information to the third party. For example, referring to FIG. 10A, the first remote unit 112 may activate the relevant elements to acquire and forward the position data (1010). The first remote unit 112 may then acquire the position data for the second remote unit 112, for example as described above, and generates a corresponding data packet (1012). The first remote unit then forwards the data packet to the third party (1014), for example via a cellular connection or electronic mail, and update the position information until the connection to the third party is terminated (1016). The first remote unit may then return to its original state (1018).

Referring to FIG. 10B, to receive the position data for the second remote unit 112, a third party system, such as a third remote unit 112 or a system associated with the communication center 110, is activated (1020). The received position data is then provided to the third party, for example via a map having the relevant position superimposed on a display (1022). The information may be updated (1024) and stored (1026) until the connection is terminated (1028), at which time the third party system may revert to an original state (1030).

Figure 11:
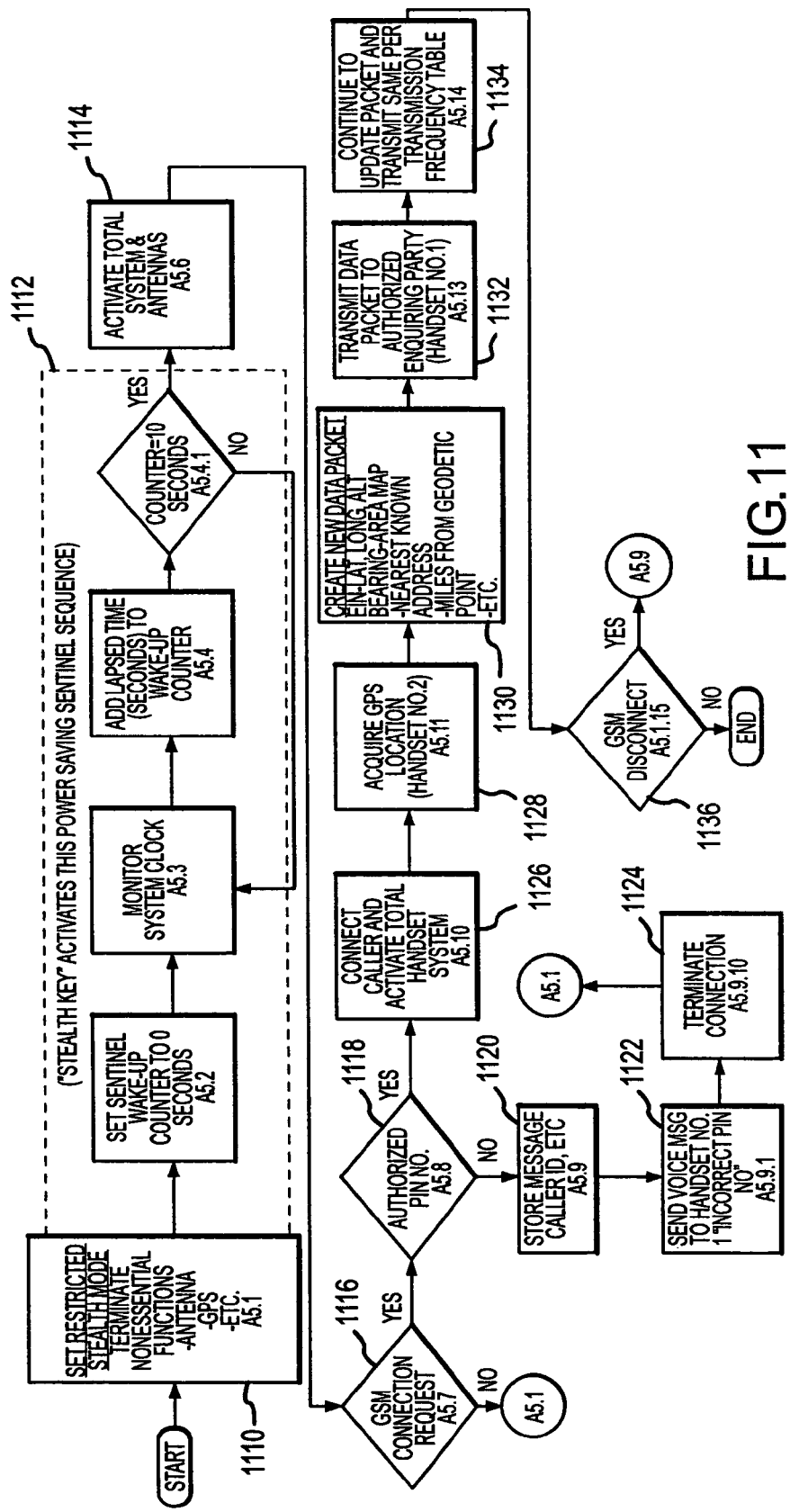
FIG. 11 is a flow diagram for a process for determining the location of a remote unit in monitoring mode.

The remote units 112 may also be configured for secure communications functions. For example, a remote unit 112 may be configured with a silent response system so that positional data may be downloaded from the remote unit without the knowledge of the user or those nearby. For example, referring to FIG. 11, a remote unit 112 may be configured to enter into the silent response mode upon a signal, such as depression of the STEALTH button or a voice command. The remote unit 112 then enters a power-saving or monitoring mode by terminating nonessential functions (1110). A timer is then suitably set such that selected functions, such as the call receiving function, is activated at intervals (1112). At the expiration of the timer, the remote unit 112 activates the selected functions (1114) and monitors the relevant frequencies for a connection request (1116). If no connection request is received, the timer is reset. If a connection request is received, the remote unit 112 receives a data packet from the source of the call. If the data packet does not include an appropriate authorization, such as an authorization code from an authorized master remote unit 300, the attempt may be logged in the remote unit's 112 memory (1120) and a message to the source of the request may be supplied indicating that the request was denied (1122). The connection may then be terminated (1124).

If a proper authorization code is received, the connection request is granted and the remote unit 112 is activated (1126). The remote unit 112 then determines its current position (1128) and creates a corresponding data packet (1130). The data packet is then transmitted to the requesting unit (1132) and updated (1134) until the connection is terminated (1136). Upon termination, the instance of the connection may be logged in the remote unit's 112 memory.

Referring to FIGS. 12A-12D a task management process 1200 by which modes of operation are set by the user includes a standard core processing function 1201, a STEALTH mode 1202, a customize operation 1204, a personal emergency operation 1206, STEALTH track security device operation 1208, a location services operation 1210, and a non-emergency process function 1212. The task management process 1200 is navigated by a user of the remote device 112.

Figure 12A:
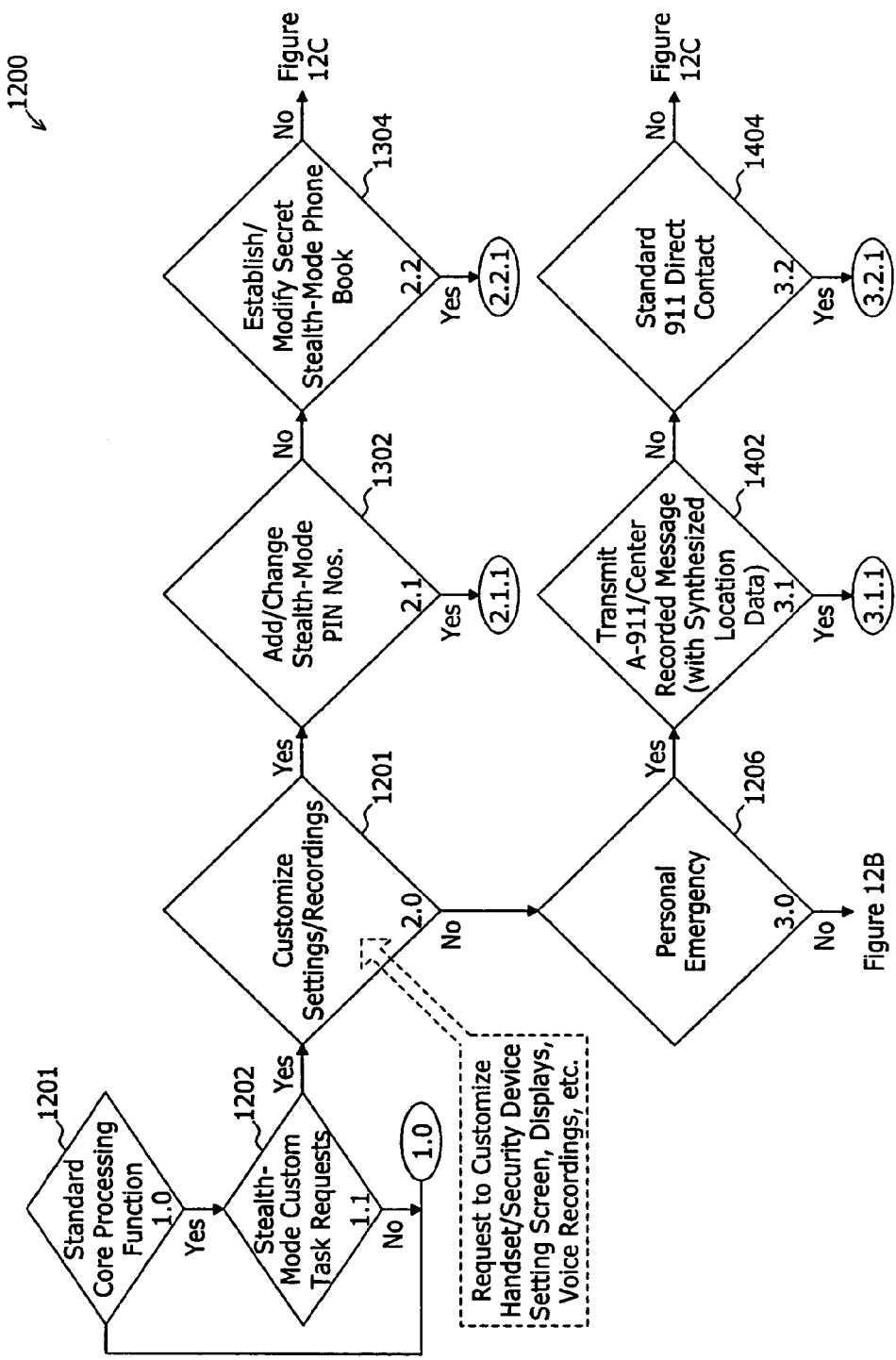
FIGS. 12A-D are a flow diagram for a task management operating process.
Figure 12B:
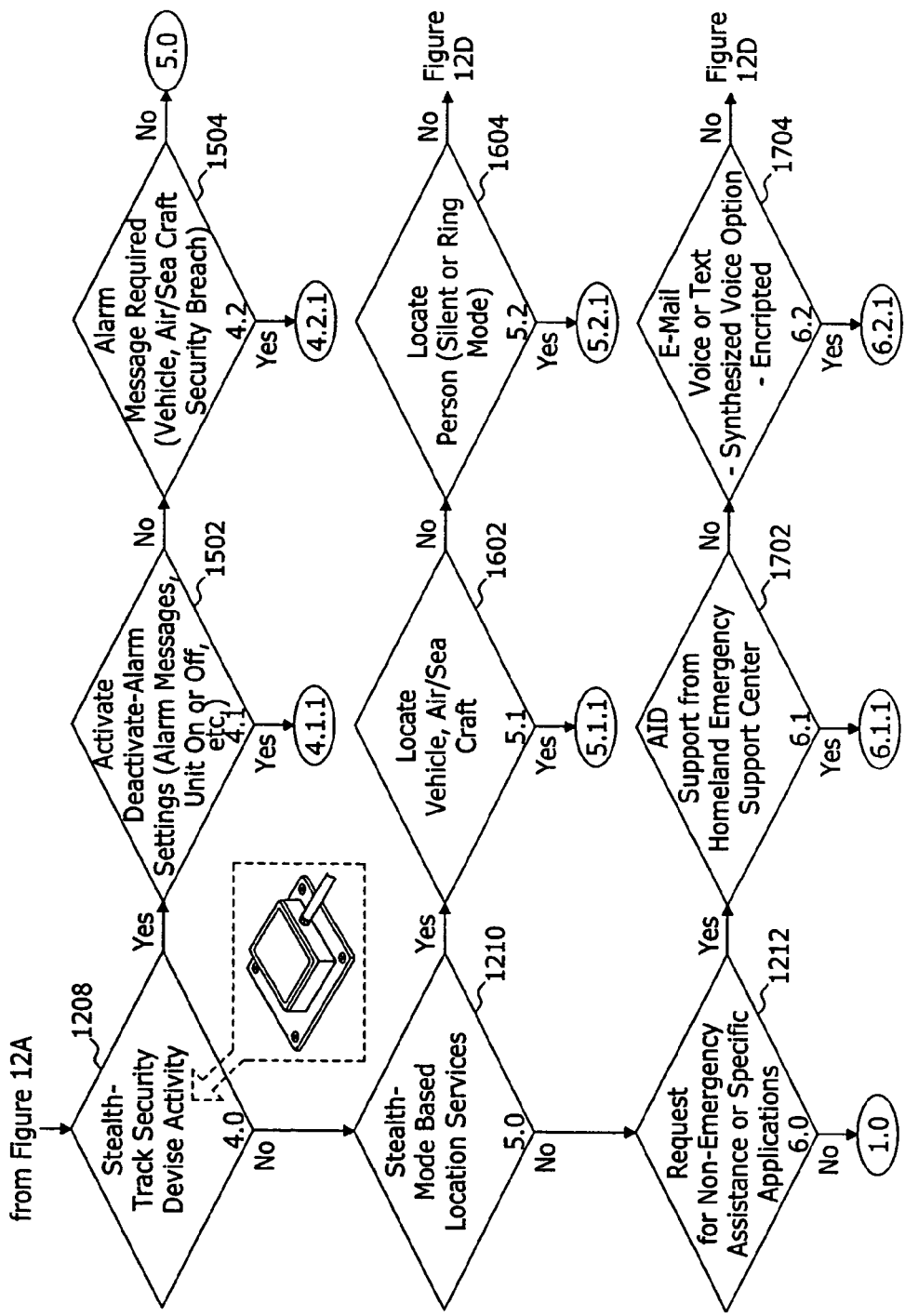
Figure 12C:
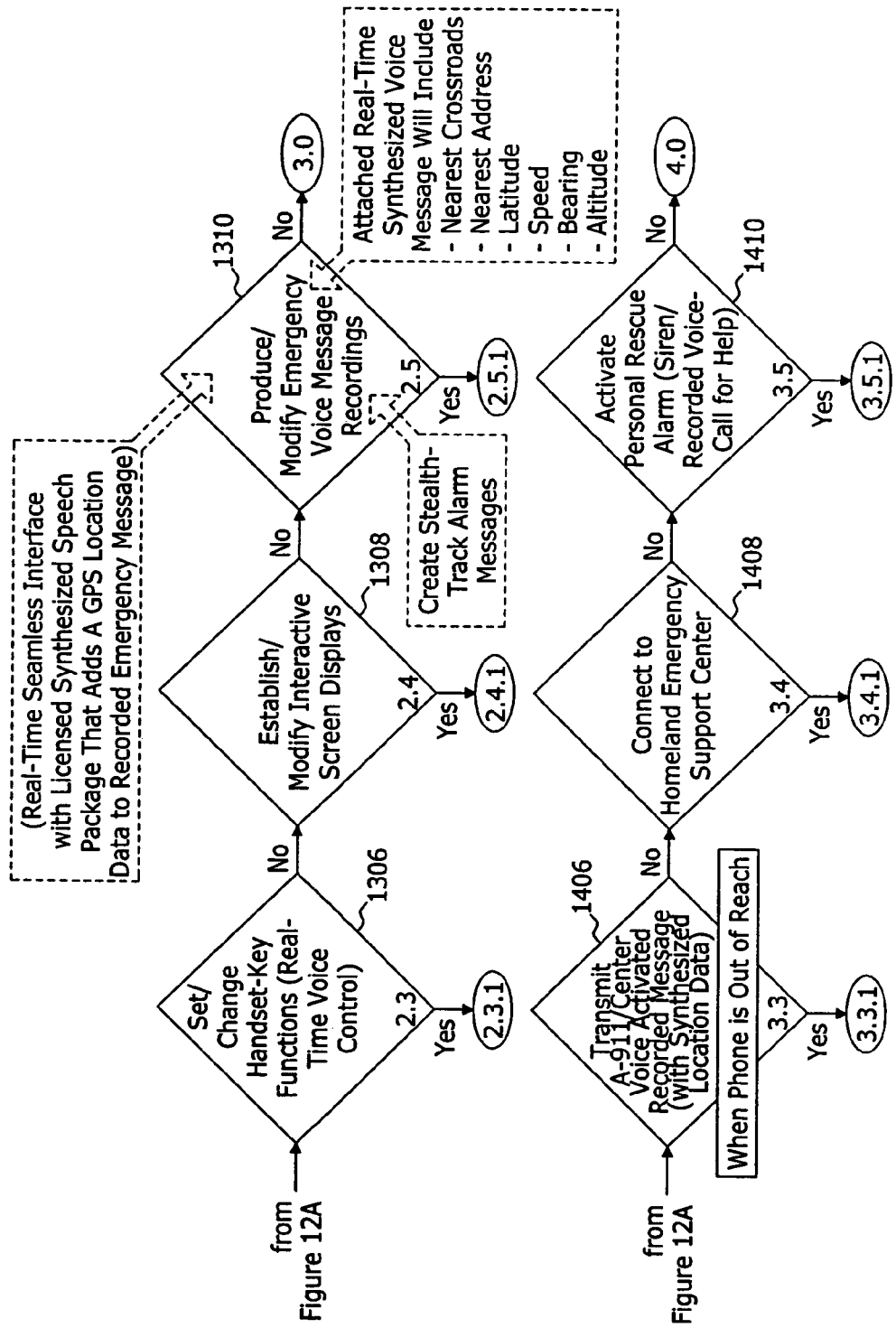
Figure 12D:
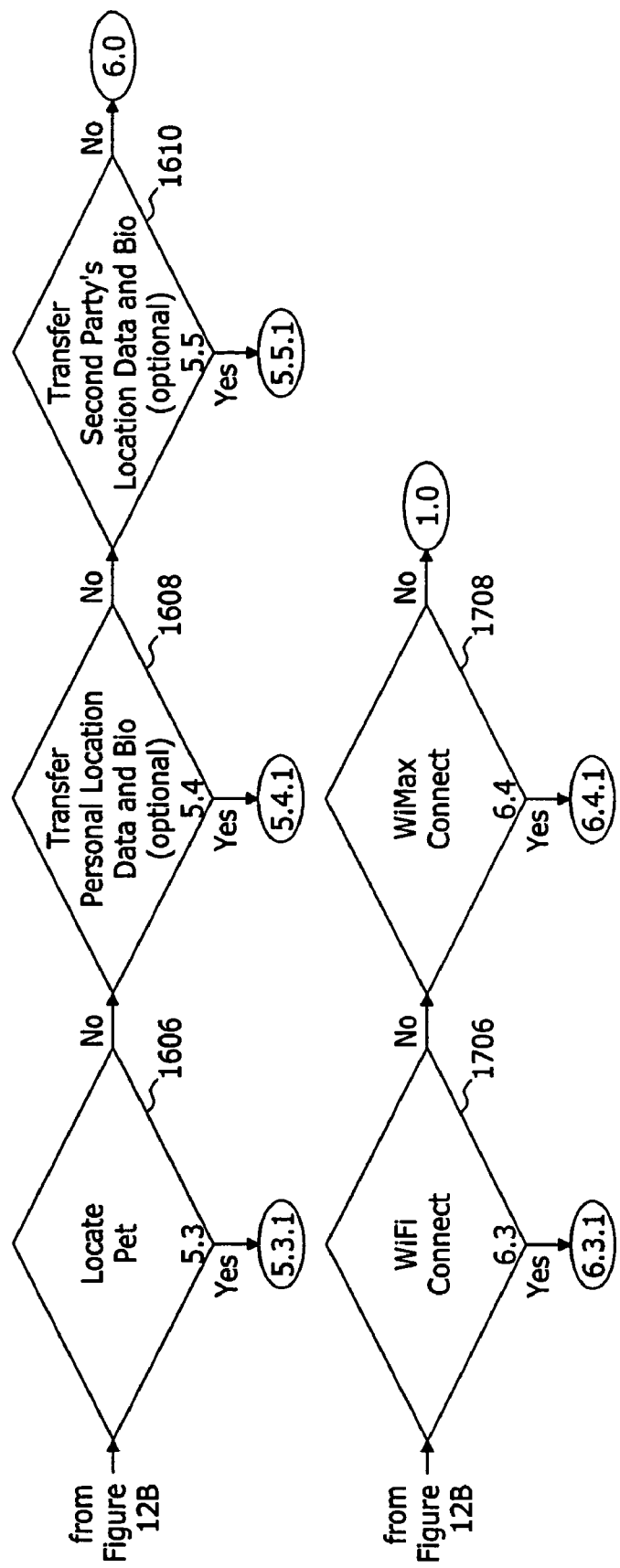
Figure 12E:
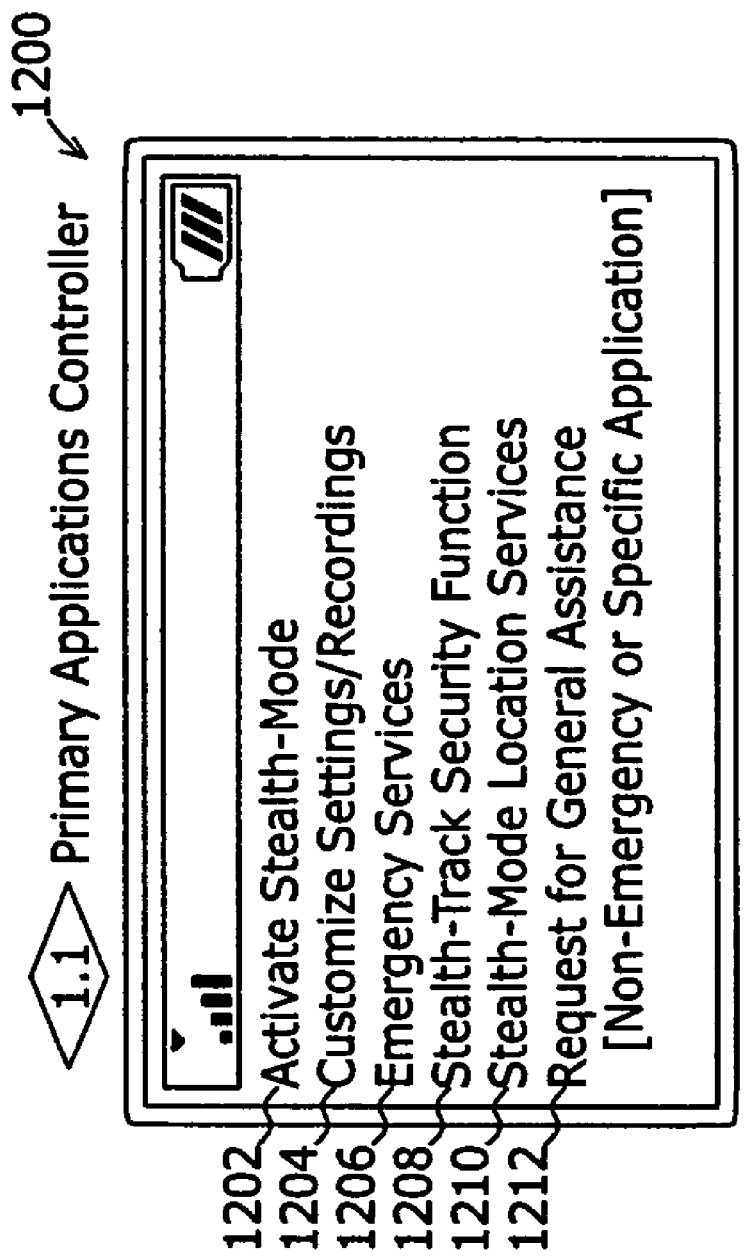
FIG. 12E is an interface menu for a task management operation.

With continued reference to FIGS. 12A-12D and referring to FIG. 12E, the task management process 1200 operates via a user interface 1220. The user interface 1220 presents to the user of a remote device 112 the available operations. Selection of the standard processing function 1201 allows use of the remote device 112 in a standard fashion and according to preset operations. Each of the STEALTH mode 1202, customize 1204, personal emergency 1206, STEALTH track security 1208, location services 1210, and non-emergency 1212 operations, includes a specific menu (displayed when chosen) of operations with which the operation is associated.

Referring to Figures 12A-12D, 13A, and 13B, selection of the custom tasks function 1204 allows the user to change settings of the STEALTH operation of the device 112. The interface 1220, in response to selection of the customize settings/recordings command 1204, provides a STEALTH mode pin numbers option 1302, a STEALTH mode secret phone book 1304, a handset key functions option 1306, a handset screen data-displays option 1308, and a message recordings option 1310. The remote unit 112 displays the customize settings menu upon entry into the STEALTH mode, and selection of the customize settings/recordings command 1204. The STEALTH mode pin numbers option 1302 allows the creation, deletion, or addition of a PIN number for access to the STEALTH mode.

The STEALTH mode secret phone book 1304 stores secret PIN numbers and associated names of chosen individuals, as well as a second STEALTH mode PIN number. The second STEALTH mode PIN number may be distributed to individuals with remote units. The STEALTH phone book 1304 can be set to restrict incoming calls according to conditions (designated by color codes) set in a STEALTH phone book table 1320. For example, the STEALTH phone book 1304 has a code red designation, a code yellow designation, and a code green designation. The callers are designated in a hierarchy that is changeable. Code red callers will be received when a code red status is activated. For example, code red can be activated during important meetings, so that only a person's designated code red callers, e.g., the person's spouse or child, can contact the subscriber by cell phone during the meeting (e.g., cause the person's phone to ring). Other callers are inhibited from ringing the person's phone, e.g., being automatically transferred directly to voicemail. Code red and code yellow callers are received when a code yellow designation is activated. All callers are received when a code green designation is activated. Termination of STEALTH mode status terminates the restricted phonebook as well. The STEALTH phone book 1304 can be in addition to a standard phonebook, which is generally available through a device software package.

The handset key functions option 1306 allows key functions on the remote unit to be programmed. Each of the remote units depicted in FIGS. 3A-3H includes at least one phone key or button. The phone keys are programmed to directly dial particular locations, such as an emergency center, guardian, police, etc. The handset key functions option 1306 allows the addition or deletion of a preprogrammed contact.

Likewise, the handset screen data-displays option 1308 allows updates, changes, and deletions to the data display. Information related to contacts, including a medical bio can be incorporated in the data screen.

The message recordings function 1310 provides for the creation or modification of message recordings. Alternatively, human and real-time synthesized speeches can form a series of emergency messages that can be activated by the physically challenged (e.g., those with impaired hearing, speech, or vision), young children, persons under duress, etc. A 9-1-1 message is transferred to emergency assistance to inform emergency assistants of the identity and condition of the caller. GPS data can be converted to text, and again converted to synthesized speech for transmission to the 9-1-1 operator, or to another remote device 112. Updated GPS data can be sent periodically to the emergency service.

A voice activated 9-1-1 message having synthesized location data can also be sent to an emergency center. For example, a user can engage a handset or remote device 112 to a vehicle's power source so that, in the event of an accident, the remote device 112 remains in position. A voice pattern recognition routine can be conditioned to operate at a distance of seven feet or more from the device 112. A user can then yell at the device 112, for example from an injured or pinned position, and activate the 9-1-1 voice command. The device 112 is set to listen for a specific command, beeps an acknowledgement, the user issues the 9-1-1 command, and a recorded and synthesized message is dispatched to the 9-1-1 operator.

Figures 13, 14:
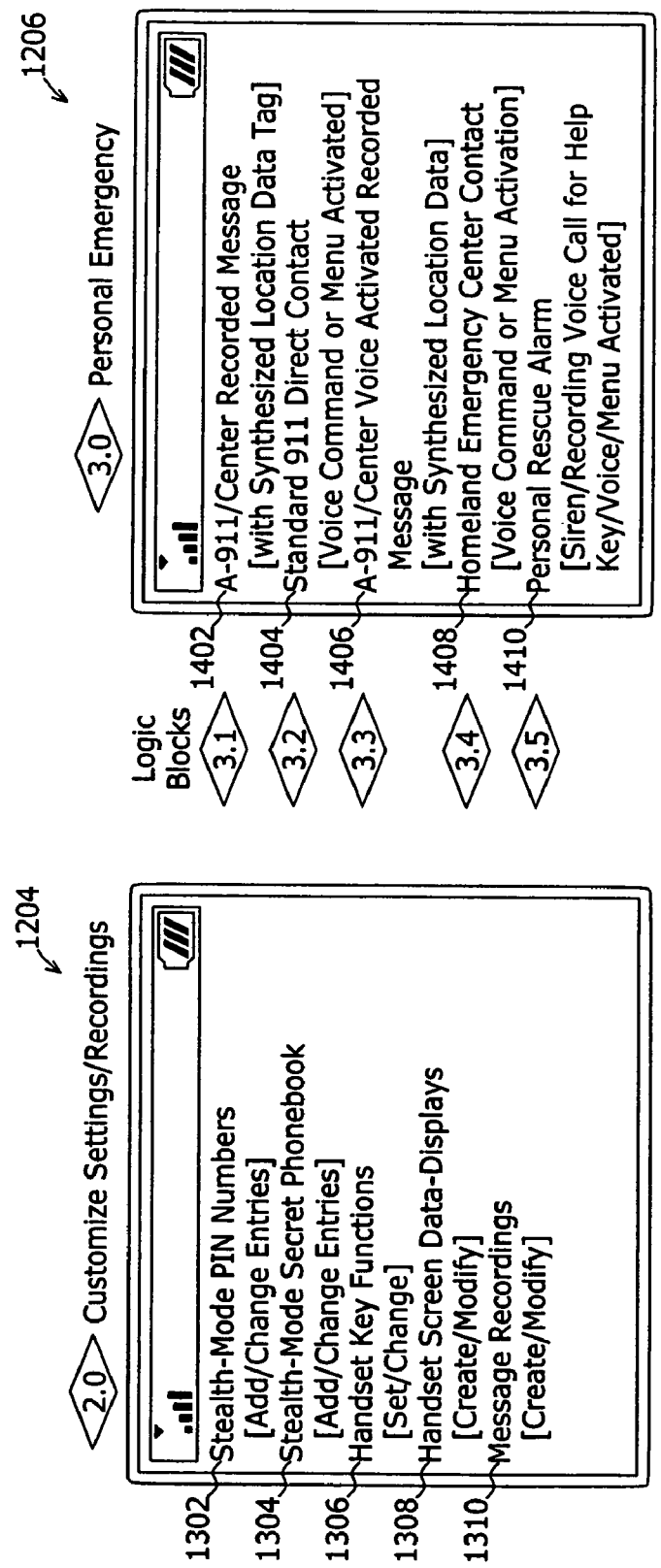

Referring again to FIGS. 12A-12D, an optional selection from the applications controller 1200 is the emergency services function 1206. Referring to FIGS. 14A and 14B, the emergency services interface and process are shown. As shown in FIG. 14A, the emergency services controller 1206 includes a 9-1-1 recorded message 1402, a 9-1-1 direct contact option 1404, a 9-1-1 voice activated message 1406, a homeland security contact 1408, and a personal rescue alarm 1410.

The 9-1-1 recorded message includes a synthesized location data tag. When activated, the 9-1-1 recorded message 1402 is transmitted to the 9-1-1 operator (e.g., the police). The direct contact option 1404 is a voice command or menu-activated call to the 9-1-1 operator for assistance. The voice-activated message 1408 includes synthesized location data. A user conditions the voice pattern recognition system to operate up to a distance, for example, of seven or more feet removed from the remote unit 112. A preprogrammed voice command activates the remote unit 112 to contact the 9-1-1 operator. The remote unit 112 responds with a beep or other confirmation notice to the user that the system has been activated, and a recorded and synthesized message is sent to the 9-1-1 operator.

Selection of the operation 1408 causes the Homeland Security or other non-emergency assistance to be contacted. Referring to FIG. 14C, the homeland security contact 1410 includes liaisons 1420, 1422, and key operation personnel 1424. A voice command or menu activation message is sent to liaisons, such as the FBI, CIA, INS, NSA, state security agencies, and the homeland security office. Other liaisons include the Center for Disease Control, school security, FEMA, EMS, Air/Sea Rescue, and local law enforcement.

The personal rescue alarm 1410 is activated upon entry of a two-digit PIN number, and sounds an alarm (e.g., a screech) to indicate an emergency situation. The emergency alarm 1410 can also be activated by other actions, such as by depressing a preprogrammed button, and the alarm can be de-activated in a number of ways also programmed into the task management system 1200. The alarm signals for help such that attacks may be deterred and assistance may be rendered.

Referring again to FIG. 12 and with reference to FIG. 15A, the track security function provides an activate alarm settings function 1502. The track security device activity can be activated or terminated. Alarms can be activated or terminated in a group, or selectively. Also, the remaining battery charge of the device can be analyzed. When the alarm is active, an alarm message is sent in response to the detection of a potential theft or security breach.

In FIG. 16A, and with reference to FIG. 12, the STEALTH mode based location services operation 1210 includes a locate vehicle function 1602, a locate person function 1604, a locate pet function 1606, a transfer personal data function 1608, and a transfer second party location function 1610. By selecting the locate vehicle function 1602, the track device is activated to respond with location data. Information requested appears on the remote device 112 as a geodetic point superimposed over an area map. Inquiries can be made for major crossroads, nearest address, latitude, longitude, speed, bearing and altitude.

The locate person function 1604 is available between two remote devices 112. Entry of a PIN allows the user of a remote device 112 to locate a second user. The locate person function 1604 operates in an alarm mode and in a silent mode. Information regarding the location of the second user is presented on the remote device 112 as a geodetic point superimposed over an area map.

The locate pet function 1606 tracks the location of a pet on a remote device 112. A voice command from the user activates the locate pet function 1606, and the pet can be tracked whether the pet is stationary or moving. Voice commands are transferred to the pet device from the user so that the owner can give guidance commands, or other voice messages (e.g., reassurances) to the pet. This functionality is not limited to use with pets.

Information relating to a remote device or its user may be transferred to a selected recipient. The transfer personal data function 1608 transfers personal data and medical information to a second party such as to a medical team or rescue party. Further, the transfer second party's data function 1610 transfers a second party's (e.g., a family member's) location data and medical bio to a third party (e.g., a medical team or rescue party). Transfer of data can occur between any two remote devices 112 having STEALTH mode communication. Information can be transferred to a medical team or rescue party while response to the emergency is underway. Location information can be displayed as a geodetic point superimposed on an area map, which may be transferred to one or a number of remote devices 112. Provision of location and/or medical bio information may be inhibited unless authorized (e.g., as indicated by receipt of a password or PIN).

Referring again to FIG. 12 and FIG. 17A, the request for non-emergency support function 1212 provides an option of selecting an AID button 1702, which provides contact to a homeland emergency support center. AID services include, but are not limited to, roadside assistance, travel recommendations, and other non-emergency services. Further, an email function 1704 allows email communication to a second party. Users may also select WiFi connect 1706 or WiMax connect 1708 options to access Wireless Fidelity (Wi Fi) locations (e.g., hot spots) when in an area of coverage or make a Wi Max connection.

Figure 18:
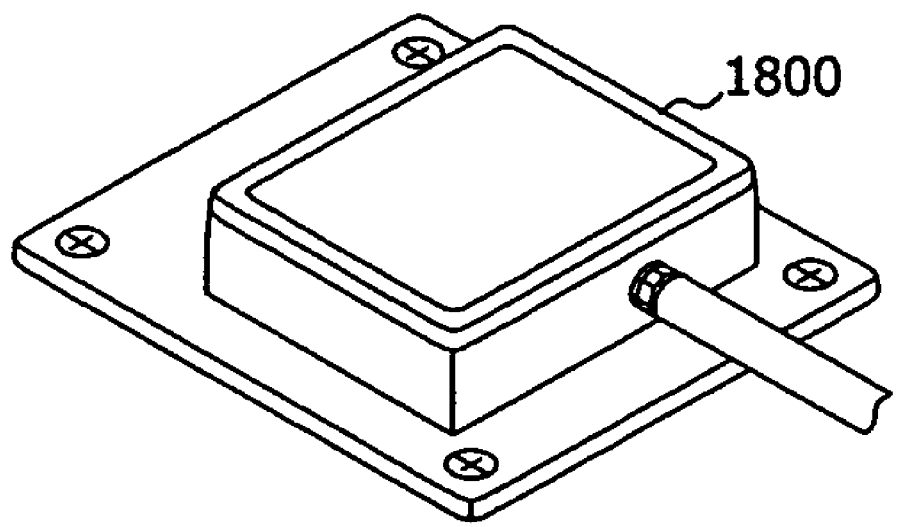
FIG. 18 is an alternative remote unit.

An alternative tracking device to the remote device 112 includes a STEALTH Track Security Device. Referring to FIG. 18, a track security device 1800 can be installed in a vehicle, such as a car, truck, motorcycle, an air/sea craft, or the like. Alarm messages are transmitted when the software determines that theft or a security breach has occurred. The track security device 1800 includes a trickle charge connection to the battery of the vehicle. Alarm messages can include a theft notice (trickle charge is at "0"), a warning that the secondary (backup) battery can continue to operate for 24 hours, a warning that the secondary battery can continue to operate for 3 hours, and that the perimeter has been violated. The track security device 1800 can contact the vehicle owner's cell phone if it determines that the power source has been disconnected. With the text or voice message from the track security device 1800, the owner can locate the vehicle on his/her remote device 112 GPS, and call contact local police.

The track security device can be a standard remote device 112, such as that discussed with respect to FIG. 13F, encased in a protective casing accessory. The casing can be crushproof or waterproof to a particular depth, such as up to a depth of 50 feet.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The present invention has been described above with reference to a preferred embodiment. However, changes and modifications may be made to the preferred embodiment without departing from the scope of the present invention. These and other changes or modifications are intended to be included within the scope of the present invention.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

What is claimed is:

1. A communication terminal configured to communicate with a communication network that is configured to receive signals from multiple communication units, transfer data within the network, and transmit the signals to the communication units and to at least another communication destination, the communication terminal comprising:
   a transmitter configured to send communication signals;
   a controller configured to initiate communication from the terminal to the communication network; and
   a programmable directory configured to store an identification information for at least one communication unit in the communication network;
   wherein the controller is configured to prohibit communication from the terminal to the communication network except for communications intended for the at least one communication unit associated with the identification information in the directory, and the at least another communication destination.

2. The communication terminal of claim 1 wherein the other communication destination is an emergency service.

3. The communication terminal of claim 1 wherein the at least one communication unit is associated with a school attended by a user of the mobile communication terminal.

4. The communication terminal of claim 1 wherein the transmitter is configured to communicate with the communication network wirelessly.

5. A communication terminal configured to communicate with a communication network that is configured to receive signals from multiple communication units, transfer data within the network, and transmit the signals to the communication units and to at least another communication destination, the communication terminal comprising:

a receiver configured to receive communication signals;

a controller configured to regulate communication from the communication network to the communication terminal; and a selector configured to be actuated to set a condition of the mobile communication unit;

wherein the controller is configured to screen incoming communications differently based upon the condition the mobile communication unit is set to, and based upon sources of the communications.

6. The communication terminal of claim 5 wherein the selector is configured to be actuated to set the condition to one of a first, second, or third condition, wherein in the first condition, only communications from a first set of sources are allowed to actuate the mobile communication unit for establishing a communication connection between the source and the mobile communication unit, and wherein in the second condition, only communications from the first set of sources and a second set of sources are allowed to actuate the mobile communication unit for establishing a communication connection between the source and the mobile communication unit.

7. The communication terminal of claim 6 wherein in the third condition all communications are allowed to actuate the mobile communication unit for establishing a communication connection between the source and the mobile communication unit.

8. A mobile communication terminal configured to communicate wirelessly with a communication network that is configured to receive signals from mobile units, transfer data within the network, and transmit the signals to the mobile units, the mobile communication unit comprising:

a transmitter configured to send communication signals;

a dedicated actuator selection of which initiates an attempt to communicate with an emergency service provider;

a memory that stores a message, the message is at least one of an audio message and a text message providing identifying information regarding a user of the mobile communication unit; and a controller coupled to the transmitter, actuator, and memory, and configured to cause the transmitter to transmit the message toward the emergency service provider if communication is established between the device and the emergency service provider.

9. The mobile communication terminal of claim 8 wherein the message provides identifying information regarding a user of the mobile communication unit, the mobile communication unit being further configured to determine a location of the mobile communication unit and to cause the transmitter to send location information toward the emergency service provider in association with the message.

10. The mobile communication terminal of claim 8 wherein the message is an audio message, wherein the mobile communication unit comprises a global positioning system to determine the location, wherein the mobile communication unit further comprises a text-to-speech translator, and wherein the mobile communication unit is configured to send translated audio corresponding to the location information toward the emergency service provider after sending the message toward the emergency service provider.

11. A communication terminal configured to communicate with a communication network that is configured to receive signals from communication units, transfer data within the network, and transmit the signals to the mobile units, the mobile communication terminal comprising:

a positioning system configured to determine a location of the mobile communication unit;

a controller configured to determine if a request to send location information regarding the location of the communication unit is authorized and to actuate sending of the location information toward a recipient if the request is authorized.

12. The mobile communication terminal of claim 11 wherein the controller is configured to actuate sending of the location information toward a source of the request as the recipient.

13. The mobile communication terminal of claim 11 wherein the controller is configured to actuate sending of the location information toward a third-party destination, indicated by the request, as the recipient.

14. The mobile communication terminal of claim 11 configured to actuate sending the location information substantially without providing an indication to a user of the mobile communication unit of the actuation of the sending.

15. The mobile communication terminal of claim 14 configured to actuate sending the location information without providing a concurrent audible or visual indication to a user of the mobile communication unit of the actuation of the sending.

* * * * *